(12) United States Patent
Villette et al.

(10) Patent No.: US 12,170,094 B2
(45) Date of Patent: Dec. 17, 2024

(54) MEDIA SEGMENT PREDICTION FOR MEDIA GENERATION

(71) Applicant: QUALCOMM Incorporated, San Diego, CA (US)

(72) Inventors: Stephane Villette, San Diego, CA (US); Sen Li, San Diego, CA (US); Pravin Kumar Ramadas, San Diego, CA (US); Daniel Jared Sinder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 198 days.

(21) Appl. No.: 18/047,572

(22) Filed: Oct. 18, 2022

(65) Prior Publication Data

US 2024/0127838 A1    Apr. 18, 2024

(51) Int. Cl.
| | |
|---|---|
| *G10L 13/06* | (2013.01) |
| *G10L 17/02* | (2013.01) |
| *G10L 21/01* | (2013.01) |
| *G10L 25/54* | (2013.01) |
| *G10L 15/26* | (2006.01) |

(52) U.S. Cl.
CPC ............ *G10L 21/01* (2013.01); *G10L 17/02* (2013.01); *G10L 25/54* (2013.01); *G10L 13/06* (2013.01); *G10L 15/26* (2013.01)

(58) Field of Classification Search
CPC ................................. G10L 13/06; G10L 15/26
See application file for complete search history.

(56) References Cited

U.S. PATENT DOCUMENTS

| | | | |
|---|---|---|---|
| 9,666,204 B2 | 5/2017 | Manjunath et al. | |
| 10,140,973 B1 * | 11/2018 | Dalmia | G06N 7/01 |
| 11,410,684 B1 * | 8/2022 | Klimkov | G10L 25/78 |

FOREIGN PATENT DOCUMENTS

| | | | |
|---|---|---|---|
| CN | 113744722 A | * | 12/2021 |
| EP | 3416166 B1 | | 8/2020 |
| WO | 2015168444 A1 | | 11/2015 |

OTHER PUBLICATIONS

International Search Report and Written Opinion—PCT/US2023/075956—ISA/EPO—Feb. 2, 2024.
Matsui T., et al., "A Text-Independent Speaker Recognition Method Robust Against Utterance Variations", Speech Processing 1. Toronto, May 14-17, 1991, [International Conference on Acoustics, Speech Signal Processing. ICASSP], New York, IEEE, US, vol. Conf. 16, Apr. 14, 1991, pp. 377-380, XP010043900, Paragraph 2, Figure 2.
Yella S. H., "Speaker Diarization of Spontaneous Meeting Room Conversations", Jan. 19, 2015, XP055826869, p. 56, Paragraph 4.3.2—p. 57, Figure 4.3, 124 Pages.

* cited by examiner

*Primary Examiner* — Feng-Tzer Tzeng
(74) *Attorney, Agent, or Firm* — QUALCOMM Incorporated; Espartaco Diaz Hidalgo

(57) ABSTRACT

A device includes one or more processors configured to input one or more segments of an input media stream into a feature extractor. The one or more processors are further configured to pass an output of the feature extractor into an utterance classifier to produce at least one representation of at least one utterance class of a plurality of utterance classes. The one or more processors are further configured to pass the output of the feature extractor and the at least one representation into a segment matcher to produce a media output segment identifier.

29 Claims, 21 Drawing Sheets

MEDIA SEGMENT PREDICTION FOR MEDIA GENERATION

I. FIELD

The present disclosure is generally related to media segmentation and prediction to facilitate media generation.

II. DESCRIPTION OF RELATED ART

Advances in technology have resulted in smaller and more powerful computing devices as well as an increase in the availability of and consumption of media. For example, there currently exist a variety of portable personal computing devices, including wireless telephones such as mobile and smart phones, tablets and laptop computers that are small, lightweight, and easily carried by users and that enable generation of media content and consumption of media content nearly anywhere.

Although the above-described technological advances have included efforts to improve communication of media content, such communication remains challenging. For example, transmission of media content generally uses significant communication bandwidth.

The above-described technological advances have also included efforts to improve generation of media content. However, many challenges associated with media generation remain. To illustrate, it can be challenging to generate speech that sounds like natural human speech. Similarly, generating natural appearing representations of human facial expressions during speech is challenging.

III. SUMMARY

According to a particular aspect, a device includes one or more processors configured to input one or more segments of an input media stream into a feature extractor. The one or more processors are further configured to pass an output of the feature extractor into an utterance classifier to produce at least one representation of at least one utterance class of a plurality of utterance classes. The one or more processors are further configured to pass the output of the feature extractor and the at least one representation into segment matcher to produce a media output segment identifier.

According to a particular aspect, a method includes inputting one or more segments of an input media stream into a feature extractor. The method also includes passing an output of the feature extractor into an utterance classifier to produce at least one representation of at least one utterance class of a plurality of utterance classes. The method further includes passing the output of the feature extractor and the at least one representation into a segment matcher to produce a media output segment identifier.

According to a particular aspect, a non-transitory computer-readable medium stores instructions that, when executed by one or more processors, cause the one or more processors to input one or more segments of an input media stream into a feature extractor. The instructions, when executed by the one or more processors, also cause the one or more processors to pass an output of the feature extractor into an utterance classifier to produce at least one representation of at least one utterance class of a plurality of utterance classes. The instructions, when executed by the one or more processors, further cause the one or more processors to pass the output of the feature extractor and the at least one representation into a segment comparator to produce a media output segment identifier.

According to a particular aspect, an apparatus includes means for inputting one or more segments of an input media stream into a feature extractor. The apparatus also includes means for passing an output of the feature extractor into utterance classifier to produce at least one representation of at least one utterance class of a plurality of utterance classes. The apparatus further includes means for passing the output of the feature extractor and the at least one representation into a segment matcher to produce a media output segment identifier.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
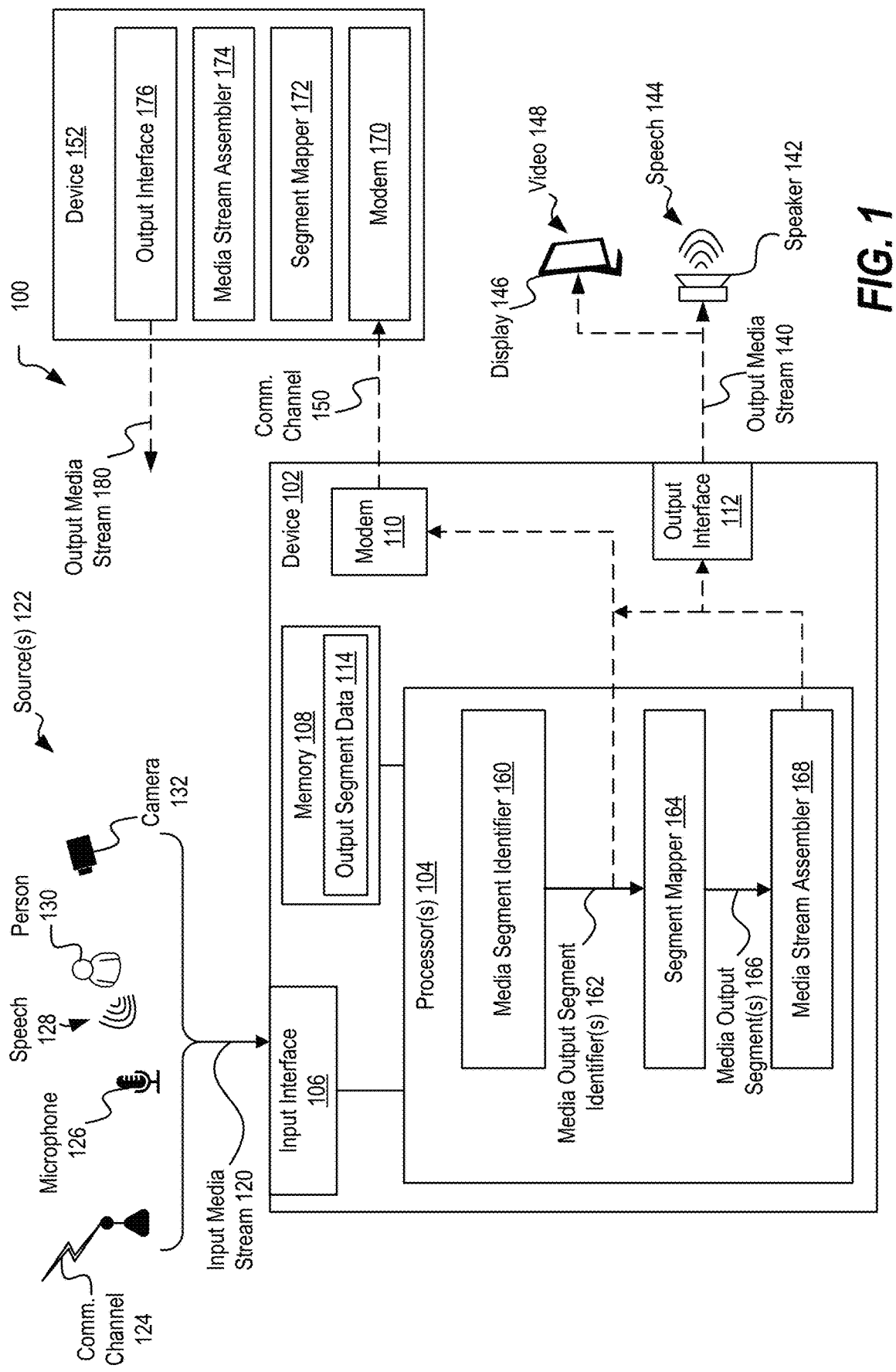
FIG. 1 is a block diagram of a particular illustrative aspect of a system operable to generate a media output segment identifier based on an input media stream, in accordance with some examples of the present disclosure.

People are particularly adept at recognizing the facial expressions and speech sounds of other people. Near-realistic depictions of humans in media (such as in some computer-generated graphics) that are only slightly unnatural can lead to the so called "uncanny valley" effect, which can cause people consuming such media to experience emotional unease or even revulsion. Even minor differences between human-like representations (e.g., faces or voices) in media and natural (i.e., real) human depictions can produce such unease. Further, computer-generated voices can be harder to understand due to unnatural rhythms and emphasis, and a lack of natural variations in sounds that are present in human speech.

Systems and methods of media segmentation and prediction to facilitate media generation are disclosed. For example, according to a particular aspect, at least audio content of a media stream is segmented and processed to determine a media output segment identifier. The media output segment identifier includes data sufficient to select a particular media segment for output. In a particular aspect, the media segment corresponds to a segment of pre-recorded natural human speech. In some implementations, the media segment includes sound representing one or more utterances. In some implementations, the media segment also, or alternatively, includes one or more images depicting human facial movements associated with generation of the one or more utterances.

As one simple, non-limiting example, the input media stream may include speech sounds of a first human speaker. In this example, each set of one or more speech sounds (e.g., each phoneme, sets of phonemes, or other segments of an utterance) is processed to generate a corresponding media output segment identifier. In this example, the media output segment identifier may include an array or vector of values that identifies one or more media segments, which correspond to pre-recorded media associated with another human speaker generating the same or similar speech sound(s). The media output segment identifier can be used to generate an output media stream, based on the pre-recorded media. For example, the media output segment identifier can be transmitted from a first device that received the input media stream to a second device. The second device can generate an output media stream that includes realistic speech sounds based on the speech sounds of the input audio stream. Additionally, or alternatively, the output media stream generated by the second device can include a realistic depiction of facial movements (e.g., lip movements) of a person uttering speech sounds based on the speech sounds of the input audio stream.

The pre-recorded media used to generate the output media stream may depict the same person that speaks to generate the input media stream; however, this is not required. Using pre-recorded media of the same person that speaks to generate the input media stream can be useful, for example, during a telephone conversation where several people are communicating and expect to hear familiar voices. However, using pre-recorded media of a different person than the person that speaks to generate the input media stream can also be useful. For example, storing data associated with the pre-recorded media used to generate the output media stream uses significant memory resources. Accordingly, for use cases in which it is not important to have a familiar voice, the pre-recorded media content from a small number of people (e.g., one, two, five, or another number of people) may be stored and used to generate the output media streams for any number of people who provide input media streams. To illustrate, one set of pre-recorded media content may be stored and used to generate the output media stream irrespective of who provided the input media stream.

Another example of when it may be beneficial to use pre-recorded media of a first person to generate an output media stream based on speech of a second person is when it is desirable to change speech characteristics between the input media stream and the output media stream. To illustrate, if the second person has an accent that is difficult for some listeners to understand, speech of the second person can be processed and used to generate an output media stream that includes speech sounds of the first person, where the first person has a different accent that is more easily understood. Other examples of when it may be beneficial to use pre-recorded media of a first person to generate an output media stream based on speech of second person include voice changing or anonymization.

In a communications situation, the media output segment identifier may be determined on a transmitter side or a receiver side of a communication channel. For example, a transmitting device may receive an input media stream and determine a media output segment identifier for each segment of the input media stream. In this example, the transmitting device can send data representing the media output segment identifiers to a receiving device, and the receiving device can generate an output media stream based on the media output segment identifiers. In general, a media output segment identifier is significantly smaller than (e.g., represented by fewer bits than) the media content processed to determine the media output segment 166. As such, communication resources (e.g., bandwidth, channel time, etc.) can be saved by transmitting the media output segment identifier rather than the input media stream it represents.

As another example, the transmitting device can send data representing the input media stream using any available communication scheme (e.g., using a voice-over-internet protocol). In this example, the input media stream may be transmitted in a sequence of packets. In this example, the receiving device produces an output media stream based on the received packets; however, occasionally, the receiving device may not receive one or more packets, or one or more packets may be corrupted when received. In this example, the missing or corrupted packet(s) leave the output media stream with a gap. The receiving device can fill the gap by predicting one or more media output segment identifiers corresponding to portions of the input media stream associated with the missing or corrupted packet(s). Filling the gap in the output media stream based on the predicted media output segment identifier(s) may generate a more natural sounding output than other packet loss concealment processes.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 102 including one or more processors ("processor(s)" 104 of FIG. 1), which indicates that in some implementations the device 102 includes a single processor 104 and in other implementations the device 102 includes multiple processors 104. For ease of reference herein, such features are generally introduced as "one or more" features and are subsequently referred to in the singular or optional plural (as indicated by "(s)" in the name of the feature) unless aspects related to multiple of the features are being described.

As used herein, the terms "comprise," "comprises," and "comprising" may be used interchangeably with "include," "includes," or "including." Additionally, the term "wherein" may be used interchangeably with "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

Referring to FIG. 1, a particular illustrative aspect of a system 100 configured to generate one or more media output segment identifiers 162 based on an input media stream 120 is shown. Additionally, in the example illustrated in FIG. 1, the system 100 is configured to generate an output media stream 140 and/or an output media stream 180 based on the media output segment identifier(s) 162.

The system 100 includes a device 102 that is coupled to or includes one or more sources 122 of media content of the input media stream 120. For example, the source(s) 122 may include a microphone 126, a camera 132, a communication channel 124, or a combination thereof. In the example illustrated in FIG. 1, the source(s) 122 are external to the device 102 and coupled to the device 102 via an input interface 106; however, in other examples, one or more of the source(s) 122 is a component of the device 102. To illustrate, the source(s) 122 may include a media engine (e.g., a game engine or an extended reality engine) of the device 102 that generates the input media stream 120 based on instructions executed by one or more processors 104 of the device 102.

The input media stream 120 includes at least data representing speech 128 of a person 130. For example, when the sources 122 include the microphone 126, the microphone 126 may generate signals based on sound of the speech 128. When the source(s) 122 include the camera 132, the input media stream 120 may also include one or more images (e.g., video frames) depicting the person 130. When the source(s) 122 include the communication channel 124, the input media stream 120 may include transmitted data that represents the speech 128, such as a plurality of data packets encoding the speech 128. The communication channel 124 may include or correspond to a wired connection between two or more devices, a wireless connection between the two or more devices, or both.

In the example of FIG. 1, the device 102 is configured to process the input media stream 120 to determine the media output segment identifier(s) 162. Each media output segment identifier 162 indicates one or more media segment(s) that are to be included in the output media stream 140 to represent one or more corresponding segments of the input media stream 120. As an example, the input media stream 120 may be parsed into segments that each correspond to one or more phonemes or other utterance segments of the speech. In this example, each media output segment identifier 162 corresponds to a media segment that includes one or more phonemes or other utterance segments of the speech similar to the one or more phonemes or other utterance segments of the speech 128 of the input media stream 120, as explained further below.

In FIG. 1, the device 102 includes an input interface 106, an output interface 112, the processor 104, memory 108, and a modem 110. The input interface 106 is coupled to the processor 104 and configured to be coupled to one or more of the source(s) 122. For example, the input interface 106 is configured to receive a microphone output from the microphone 126 and to provide the microphone output to the processor 104 as the input media stream 120.

The output interface 112 is coupled to the processor 104 and configured to be coupled to one or more output devices, such as one or more speakers 142, one or more display devices 146, etc. The output interface 112 is configured to receive data representing the output media stream 140 from the processor 104 and to send the output media stream 140 corresponding to the data to the output device(s).

The processor 104 is configured to receive the input media stream 120 and determine the media output segment identifiers 162 based on the input media stream 120. In the example illustrated in FIG. 1, the processor(s) 104 include a media segment identifier 160, a segment mapper 164, and a media stream assembler 168. The media segment identifier is configured to process the input media stream 120 and determine the media output identifier(s) 162, the segment mapper 164 is configured to determine one or more media output segments 166 based on the media output identifier(s) 162, and the media stream assembler 168 is configured to generate an output media stream based on the media output segment(s) 166, as described in further detail below. Each of the media segment identifier 160, the segment mapper 164, and the media stream assembler 168 includes or corresponds to instructions that are executable by the processor(s) 104 to perform the various operations described herein.

In some implementations, the media segment identifier 160 includes one or more trained models. Examples of trained models include machine-learning models, such as neural networks, adaptive neuro-fuzzy inference systems, support vector machines, decision trees, regression models, Bayesian models, or Boltzmann machines, or ensembles, variants, or other combinations thereof. Variants of decision trees include, for example and without limitation, random forests, boosted decision trees, etc. Variants of neural networks include, for example and without limitation, transformers, self-attention networks, convolutional neural networks, deep neural networks, deep belief networks, etc.

In a particular implementation, the media segment identifier 160 is configured to parse the input media stream 120 into segments. Each segment represents a portion of the input media stream 120 that can be mapped to a media output segment 166. As a non-limiting example, each segment may include silence, background noise, one or more phonemes or other utterances of the speech 128, etc. In some implementations, parsing of the input media stream is based on content of (e.g., sounds within) the speech 128. In such implementations, different segments can represent different durations of the input media stream 120. To illustrate, a first segment may correspond to 50 milliseconds of the input media stream 120, and a second segment may correspond to 160 milliseconds of the input media stream 120. In one experiment, a sample input media stream 120 with an overall duration of about 2.5 hours of English-language speech was processed to generate about 96,000 segments, and an average segment represented about 100 milliseconds of the input media stream 120. The specific duration represented by the segments may vary from one implementation to another based on, for example, the content of the speech 128, the language(s) of the speech 128, and how one or more models of the media segment identifier 160 were trained. Further, although variable duration segments are described herein, in some implementations, fixed duration segments may be used.

In a particular implementation, after the media segment identifier 160 determines a segment, the segment (and optionally one or more nearby segments) may be input to a feature extractor of the media segment identifier 160. The feature extractor is configured to generate feature data (e.g., a feature vector, a feature array, a feature map, a set of values representing speech parameters, etc.) that represents aspects of the segment. In some implementations, the feature extractor is a temporally dynamic feature extractor. For example, the feature data associated with a particular segment may be affected by the content of one or more segments that precede the particular segment in the input media stream 120, may be affected by the content of one or more segments that follow the particular segment in the input media stream 120, or both. Examples of trained models that can be used to perform temporally dynamic feature extraction include, without limitation, recurrent neural networks (RNNs) (e.g., neural networks with one or more recurrent layers, one or more long short-term memory (LSTM) layers, one or more Gated Recurrent Unit (GRU) layers, etc.), recurrent convolutional neural networks (RCNNs), self-attention networks (e.g., transformers), other machine-learning models that are adapted to process time-series data in a temporally dynamic manner, or variants, ensembles, or combinations thereof.

According to a particular aspect, the input media stream 120 includes a sequence of data frames of content from the source(s) 122, and the media segment identifier 160 generates a sequence of the media output segment identifiers 162 based on the input media stream 120. Each media output segment identifier 162 is generated based on one or more data frames of the input media stream 120. Further, the number of data frames of the input media stream 120 used to generate a single media output content identifier 162 may vary from one media output segment identifier 162 to the next. As one, non-limiting example, each data frame may represent 25 milliseconds of audio content, and each media output segment identifier 162 may represent between 25 milliseconds of audio content and several hundred milliseconds of audio content. Thus, the feature extractor may be viewed as a sequence-to-sequence feature extractor that is configured to generate a sequence of sets of feature data (e.g., feature vectors, feature arrays, feature maps, or sets of values of speech parameters) based on a sequence of content of the input media stream 120. Viewed in this way, the sequence-to-sequence feature extractor takes in data at a first rate (e.g., one data frame every 25 milliseconds) and outputs data at a second rate (e.g., one media output segment identifier 162 for every 25 millisecond to N×25 milliseconds, where N is an integer greater than or equal to one) where the first and second rates are, on average, unequal.

As one example, the feature extractor may generate one media output segment identifier 162 for each phoneme, each set of phonemes, or some other utterance unit of the speech 128. As used herein, the term "phoneme" is used broadly to refer to a unit of sound that can distinguish one word from another in a particular language. Although various sources have put forth or agreed upon particular lists of "phonemes" that are useful for academic purposes, no such list is specifically referenced by the term phoneme as used herein. In implementations in which a trained model is used to segment the speech 128, the specific phonemes or other utterance units used to distinguish segments can be based on the training of the model. As an example, in the experiment referred to above in which approximately 2.5 hours of speech was segmented into approximately 96,000 segments, the trained model that performed the segmentation was trained to group biphones into a segment, where a biphone refers to a sequential pair of phonemes.

In addition to the feature extractor, the media segment identifier 160 includes other components configured to determine the media output segment identifiers 162 based on the feature data output by the feature extractor. In some implementations, a media output segment identifier 162 includes multiple elements of a vector, an array, or another data structure, and the multiple elements include one element for each media output segment 166 that can be indicated by the media output segment identifier 162. For example, if the segment mapper 164 is able to access or generate 2000 distinct media output segments 166, then in this implementation, the media output segment identifier 162 may include a vector with 2000 elements, each of the 2000 elements corresponding to a respective one of the 2000 media output segments 166.

In some such implementations, each media output segment identifier 162 is a one-hot vector or one-hot array (or an encoded version of a one-hot vector or one-hot array). To illustrate, continuing the example above, if the segment mapper 164 is able to access or generate 2000 distinct media output segments 166 and the media output segment identifier 162 is a one-hot vector, 1999 elements of the media output segment identifier 162 will have a first value (e.g., a 0 value) indicating that the media output segments 166 corresponding to these elements are not indicated by the media output segment identifier 162, and 1 element of the media output segment identifier 162 will have a second value (e.g., a 1 value) indicating that the media output segment 166 corresponding to this element is indicated by the media output segment identifier 162.

In some implementations, the media output segment identifier 162 is not a one-hot vector. For example, in some such implementations, the media output segment identifier 162 is a vector or array that includes multiple elements with non-zero values. To illustrate, the media output segment identifier 162 may include, for each element of the array or vector, a likelihood value that indicates a likelihood that the corresponding media output segment 166 corresponds to a segment of the input media stream 120 represented by feature data from the feature extractor. In some such implementations, the media output segment identifier 162 does not include a likelihood value for every element. For example, one or more thresholds may be used to filter the likelihood values such that only particularly relevant likelihood values are included in the media output segment identifier 162 and other likelihood values are zeroed out. To illustrate, the media output segment identifier 162 may include a top two, three, five, or some other number, of highest likelihood values, and the remaining elements of the media output segment identifier 162 may include zero values. As another illustrative example, the media output segment identifier 162 may include each likelihood value that exceeds a threshold (e.g., a likelihood of 0.1, 0.2, 0.5, or some other value), and the remaining elements of the media output segment identifier 162 may include zero values.

In several examples above, the segment mapper 164 was described as being able to access or generate 2000 distinct media output segments 166. These examples are provided merely for illustrative purposes and are not limiting. The specific number of distinct media output segments 166 that the segment mapper 164 is able to access or generate may vary from one implementation to another depending on the configuration of the media segment identifier 160, the segment mapper 164, or other factors. As one illustrative example, in the experiment referenced above in which approximately 2.5 hours of audio was processed, each identified segment (e.g., each identified biphone) of the entire 2.5 hours of audio was stored as a distinct media output segment 166. Thus, the segment mapper 164 of this experiment was able to access or generate approximately 96,000 media output segments 166, and the media output segment identifier 162 was a vector including approximately 96,000 values. It is expected that many of the media output segments 166 of this set of media output segments were very similar due to the English language having many common sounds. As such, the set of media output segments (and correspondingly, the dimensionality of the media output segment identifier 162) could be reduced by performing additional processing to identify duplicate or near-duplicate media output segments 166.

In some implementations, the segment mapper 164 is able to generate or access a set of media output segments 166 that includes every common phoneme in a particular language, every common sequential set of phonemes in the particular language, every phoneme actually used in a particular language, or every sequential set of phonemes actually used in the particular language. In some implementations, the set of media output segments 166 includes at least a representative set of common phonemes or sequential sets of phonemes in a particular language. For example, the set of media output segments 166 may be obtained from a recording of media content that is considered to be of sufficient duration and variety to correspond to a representative set. To illustrate, in the experiment referred to above, a 2.5 hour recording of English-language speech was considered to be sufficient to provide a viable representative set of media output segments 166.

While retaining media output segments that are very similar to one another (rather than deduplicating the set of media output segments) may increase the dimensionality of the media output segment identifiers 162, retaining at least some media output segments that are similar to one another can facilitate generation of more natural sounding speech in the output media stream 140. Thus, for implementations in which reduction of computing resources used to produce the output media stream 140 (such as memory required to store output segment data 114 representing the media output segments, processing time and power to compute the media output segment identifier 162, etc.) is prioritized over optimizing the natural-sounding quality of the output speech, the set of media output segments may be processed to reduce the number of duplicate or nearly duplicate media output segments. Conversely, for implementations in which generation of natural sounding speech in the output media stream 140 is more highly prioritized, a set of media output segments that includes some nearly duplicate media output segments may be used to enable production of speech with more natural sounding variation.

In implementations in which the media segment identifier 160 includes one or more models that are trained to determine the media output segment identifier 162 and the media output segment identifier 162 is high-dimensional (e.g., has thousands or tens of thousands of elements), training the one or more models can be challenging. For example, in the experiment referred to above, the media output segment identifier 162 had about 96,000 elements. The trained model (s) used to generate the media output segment identifier 162 can be thought of as classifiers that indicate a class that corresponds to one or more of the media output segments 166. To illustrate, when the media output segment identifier 162 is a one-hot vector, the single non-zero value of the media output segment identifier 162 represents a class that corresponds to a media output segment 166. Training a classifier to reliably select a single element from about 96,000 classes where some of the classes may be similar or nearly identical is a challenging training situation.

This training challenge can be reduced by using a multi-stage model to divide the inference process into hierarchical stages. For example, the 96,000 classes can be grouped into supersets (e.g., "utterance classes"). In this example, an utterance classifier of the trained models determines an utterance class associated with a particular set of feature data representing a segment of the input media stream 120. The utterance class and the feature data are provided as input to a segment matcher of the trained models to generate the media output segment identifier 162. In this hierarchical approach, providing the utterance class to the segment matcher along with the feature data skews (e.g., weights) the analysis performed by the segment matcher to favor results that assign the media output segment identifiers 162 to indicate a media output segment 166 that is in the indicated utterance class.

In FIG. 1, one or more of the media output segment identifier(s) 162 is provided to the segment mapper 164. Additionally, or alternatively, one or more of the media output segment identifier(s) 162 is provided to the modem 110 for transmission to one or more other devices (e.g., a device 152). For example, in circumstances where the output media stream 140 is to be generated by the device 102, the media output segment identifier(s) 162 are provided to the segment mapper 164, and processing at the segment mapper 164 and the media stream assembler 168 results in generation of data representing the output media stream 140. To illustrate, when the input media stream 120 is received from the communication channel 124, the device 102 may provide the output media stream 140 to the speaker 142, the display device 146, or both. Another example of when the media output segment identifier(s) 162 are provided to the segment mapper 164 is when the device 102 receives the speech 128 from the microphone 126, and the device 102 is to perform noise reduction or voice modification operations, such as changing an accent. In this example, data representing the output media stream 140 may be generated by the media stream assembler 168 and provided to the modem 110 for transmission via a communication channel 150 to the device 152. In circumstances where the device 152 is to produce an output media stream 180 based on the input media stream 120, the media output segment identifier(s) 162 are provided to the modem 110 for transmission to the device 152 via a communication channel 150. The communication channel 150 may include or correspond to a wired connection between two or more devices, a wireless connection between the two or more devices, or both.

When the media output segment identifier(s) 162 are provided to the segment mapper 164, the segment mapper 164 generates or retrieves a media output segment 166 corresponding to each media output segment identifier 162 and provides the media output segments 166 to the media stream assembler 168. For example, for a particular media output segment identifier 162, the segment mapper 164 may access corresponding output segment data 114 from the memory 108. The output segment data 114 may include the corresponding media output segment 166, or the output segment data 114 may include data that the segment mapper 164 uses to generate the corresponding media output segment 166.

In some implementations, the segment mapper 164 retrieves the media output segments 166 from a database or other data structure in the memory 108, e.g., from the output segment data 114. In such implementations, each media output segment identifier 162 includes or corresponds to a unique identifier for a corresponding media output segment stored in the memory 108, or the segment mapper 164 determines a unique identifier for a corresponding media output segment stored in the memory 108 based on to the media output segment identifier 162.

In some implementations, the segment mapper 164 generates the media output segment 166 corresponding to a particular media output segment identifier 162. For example, in such implementations, the output segment data 114 may include a set of fixed weights (e.g., link weights) that are used by the segment mapper 164 to generate the media output segments 166. In this example, the output of the segment mapper 164 includes a set of elements corresponding to media parameters. For example, the output of the segment mapper 164 may include a set of elements representing pulse code modulated (PCM) sample values, and each media output segment identifier 162 is a one-hot vector or a one-hot array. In some such implementations, a layer of a trained model that generates the media output segment identifiers 162 can be viewed as an embedding layer that is connected to an output layer represented by the segment mapper 164. Link weights between a node of the embedding layer and nodes of the output layer are predetermined (e.g., before the model is trained) and configured to cause the output layer to generate the media parameters representing the media output segment 166 corresponding to the media output segment identifier 162.

The media stream assembler 168 assembles the media output segments 166 from the segment mapper 164 to generate data representing the output media stream 140. To illustrate, the media stream assembler 168 concatenates or otherwise arranges the media output segments 166 to form an ordered sequence of media output segments 166 for playout. In some examples, the data representing the output media stream 140 is provided to the output interface 112 for playout at the speaker 142 as speech 144, to the display device 146 for playout as video 148, or both. In the same or different examples, the data representing the output media stream 140 may be provided to the modem 110 for transmission, via the communication channel 150, to the device 152.

When the media output segment identifiers 162 (rather than the output media stream 140) are provided to the modem 110 for transmission to the device 152, the device 152 can generate the output media stream 180 based on the media output segment identifiers 162. For example, in FIG. 1, the device 152 includes a modem 170, a segment mapper 172, a media stream assembler 174, and an output interface 176. When the device 152 receives a media output segment identifier 162, the modem 170 of the device 152 may provide the media output segment identifier 162 to the segment mapper 172. The segment mapper 172 operates in the same manner as the segment mapper 164 of the device 102. For example, the segment mapper 172 generates or accesses a media output segment 166 corresponding to the media output segment identifier 162. The media stream assembler 174 assembles the media output segments 166 from the segment mapper 172 to generate data representative of the output media stream 180, in the same manner as described for the media stream assembler 168, and the resulting output media stream 180 is output by the device 152 via the output interface 176.

In some implementations, the media output segments 166 available to the segment mapper 172 of the device 152 are different than the media output segments 166 available to the segment mapper 164 of the device 102. To illustrate, the segment mapper 172 may have access to a set of media output segments 166 representing speech of a first talker (e.g., a man), and the segment mapper 172 may have access to a set of media output segments 166 representing speech of a second talker (e.g., a woman). Irrespective of whether the segment mappers 164, 172 have access to the same set of media output segments 166, the media output segments 166 that are available to each segment mapper 164, 172 are mapped such that the same phonemes or other utterance units correspond to the same media output segment identifiers 162. For example, a particular media output segment identifier 162 may correspond to an "ah" sound, and both of the segment mappers 164, 172 map the particular media output segment identifier 162 to an "ah" sound of their respective available media output segments 166.

In some implementations, the media segment identifier 160 can be used to predict a media output segment identifier 162 of a portion of the input media stream 120 that is unavailable. For example, when data is received via the communication channel 124, occasionally, a packet or other data unit may be lost or corrupted. In such situations, content (e.g., media) of the packet or other data unit is not available in the input media stream 120. Because the media segment identifier 160 is configured to generate a stream of media output segment identifier(s) 162 based on an input media stream 120, the media segment identifier 160 can be used to predict a media output segment identifier 162 corresponding to the missing content. The predicted media output segment identifier 162 can be used in place of the missing content during playout of the output media stream 140.

While the description above has focused primarily on examples in which the media output segments 166 represent audio data, in some implementations, the media output segments 166 may include or correspond to images or video data. For example, a media output segment 166 may include one or more images depicting a face of a person making a particular sound (e.g., one or more phonemes or other utterances). In this example, each media output segment identifier 162 maps to a corresponding set of one or more images (e.g., to a respective media output segment 166). When the input media stream 120 represents a particular sound, the media segment identifier 160 generates a media output segment identifier 162 that maps to a media output segment 166 representative of a person making the particular sound. The set of one or more images of the media output segment 166 can be assembled with other images corresponding to other media output segments 166 to generate a sequence of image frames of the output media stream 140. The sequence of image frames provides a realistic depiction of a person speaking a series of sounds corresponding to the input media stream 120. Because the sequence of image frames is assembled from actual pre-recorded images of the person making similar sounds (though possibly in a different order as different words may have been spoken), the sequence of image frames of the output media stream 140 avoids the uncanny valley problem of fully computer-generated video.

The system 100 thus facilitates generation of audio, video, or both, of media that includes human speech in a manner that is natural in sound, appearance, or both. The system 100 also facilitates low-bit rate communication of speech data coupled with output, at a receiving device, of natural sounding speech. The system 100 further enables modification of audio characteristics of an input media stream, such as noise reduction, voice modification, anonymization, etc.

Figure 2:
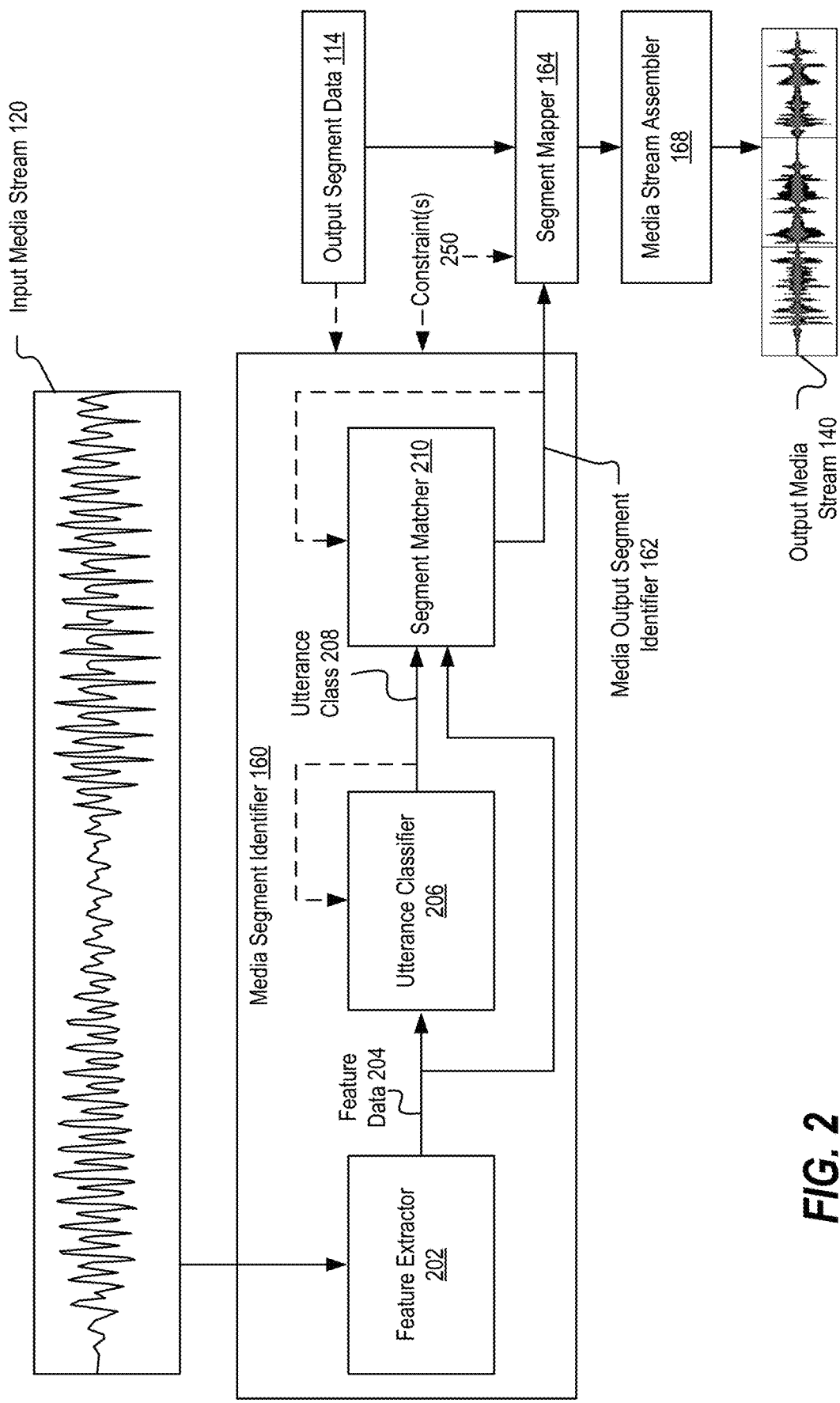
FIG. 2 is a diagram of particular aspects of the system of FIG. 1, in accordance with some examples of the present disclosure.

FIG. 2 is a diagram of particular aspects of the system 100 of FIG. 1, in accordance with some examples of the present disclosure. In particular, FIG. 2 illustrates examples of the input media stream 120, the media segment identifier 160, the media output segment identifier 162, the segment mapper 164, the media stream assembler 168, and the output media stream 140.

In the example illustrated in FIG. 2, the media segment identifier 160 includes a feature extractor 202, an utterance classifier 206, and a segment matcher 210. The feature extractor 202 is coupled to the utterance classifier 206 and the segment matcher 210 and is configured to generate feature data 204 representing a portion of the input media stream 120. For example, one or more segments of the input media stream 120 may be input into the feature extractor 202 to generate the feature data 204 corresponding to the one or more segments of the input media stream 120. As explained with reference to FIG. 1, the input media stream 120 may include data representing speech and optionally may include data representing other content, such as other sounds and/or images.

In some implementations, the feature extractor 202 is a temporally dynamic feature extractor. In such implementations, each set of feature data 204 generated by the feature extractor 202 represents content of one or more segments of the input media stream 120 in their temporal context relative to one or more other segments of the input media stream 120. To illustrate, a particular set of feature data 204 may represent content of two segments of the input media stream 120 in the context of one or more preceding segments of the input media stream 120, in the context of one or more subsequent segments of the input media stream 120, or both. In some such implementations, the temporally dynamic feature extractor is a segment-to-segment feature extractor. In such implementations, each set of feature data 204 represents a variable number of segments of the input media stream 120.

In some implementations, the feature extractor 202 includes or corresponds to an audio processor that is configured to extract values of particular speech parameters. In such implementations, the feature data 204 includes data representing the speech parameters. Non-limiting examples of such speech parameters include speech energy, pitch, duration, spectral representation, spectral envelope, one or more other measurable or quantifiable parameters representing speech, or combinations thereof. In some implementations, the feature extractor of FIG. 6 includes one or more trained models and an audio processor. In such implementations, the feature data 204 may include a feature vector and speech parameters.

In a particular implementation, the feature data 204 includes a vector or array encoding information regarding corresponding segment(s) of the input media stream 120. When the feature data 204 corresponds to a feature vector or feature array, the feature data 204 generally does not include human interpretable content. For example, the feature data 204 may encode the segment(s) of the input media stream 120 into a high-dimensional features space for further processing by the utterance classifier 206, the segment matcher 210, or both, of the media segment identifier 160.

In the example illustrated in FIG. 2, the feature data 204 is passed to the utterance classifier 206. The utterance classifier 206 is configured (and trained) to determine an utterance class 208 of a segment of the input media stream 120 based on the feature data 204. Optionally, the utterance class 208 may be determined further based on feedback of a classification associated with a prior set of feature data 204. The utterance class 208 associated with the segment(s) is one of a plurality of utterance classes, the specific number and nature of which depends on the configuration of the media segment identifier 160. As one example, each utterance class can represent a phoneme or a set of phonemes. In this example, the particular utterance class 208 indicated by the utterance classifier 206 is an estimate of which phoneme (s) are represented by the segment(s) of the input media stream 120 represented by the feature data 204. In other examples, the utterance classes represent biphones or other groupings of human-made sounds.

In the example illustrated in FIG. 2, the feature data 204 and the utterance class 208 associated with the feature data 204 are passed to the segment matcher 210. The segment matcher 210 is configured to determine the media output segment identifier 162 based on the feature data 204 and the utterance class 208. As explained above, in some implementations, the media output segment identifier 162 includes a high-dimensional vector or array (e.g., a vector including thousands or tens of thousands of elements). In such implementations, passing the utterance class 208 to the segment matcher 210 along with the feature data 204 improves the accuracy of generation of the media output segment identifier 162 by the segment matcher 210. For example, the utterance class 208 may weight the analysis of the segment matcher 210 to favor selection of media output segment identifiers 162 that are associated with the utterance class 208. As another example, a search space checked by the segment matcher 210 may be limited based on the utterance class 208. To illustrate, in some implementations, the segment matcher 210 compares speech parameters of the feature data 204 to speech parameters of candidate segments to determine the media output segment identifier 162. In such implementations, the candidate segments may be selected based on the utterance class 208 such that the candidate segments represent a subset of the available output segments that include sounds corresponding to the utterance class 208.

In particular implementations, the feature extractor 202, the utterance classifier 206, and the segment matcher 210 each include or correspond to trained model(s). In some such implementations, the feature extractor 202, the utterance classifier 206, and the segment matcher 210, are trained together. For example, the feature extractor 202, the utterance classifier 206, and the segment matcher 210, may be trained together at the same time. As another example, the feature extractor 202, the utterance classifier 206, and the segment matcher 210 may be trained in an iterative, sequential manner. To illustrate, in a first iteration, one or more first models are trained to generate an output based on an input, and in a second iteration, one or more second models are trained to generate the input or to use the output of the one or more first models. In still another example, the feature extractor 202 and the utterance classifier 206 may be trained independently of the segment matcher 210. In this example, the feature extractor 202 and the utterance classifier 206 are trained to generate the feature data and utterance class 208, and used to train one or more different segment matcher 210, such as two segment matchers 210 that are configured to generate different media output segment identifiers 162 that map to different sets of media output segments. To illustrate, one segment matcher 210 may map to a high-dimensional media output segment identifier that is associated with a large collection of media output segments and another segment matcher 210 may map to a low-dimensional media output segment identifier. In this illustrative example, the high-dimensional media output segment identifier may be used in circumstances in which generation of a high-fidelity and natural sounding output media stream 140 is desired, and the low-dimensional media output segment identifier may be used in circumstances in which conservation of processing resources or communication resources is desired.

The segment matcher 210 is configured to generate the media output segment identifier 162, which, as described with reference to FIG. 1, is provided to the segment mapper 164. The segment mapper 164 uses the media output segment identifier 162 to access or generate one or more media output segments, which are provided to the media stream assembler 168 to generate the output media stream 140.

One benefit of using a multistage approach to generation of the media output segment identifier 162, as illustrated in FIG. 2, is that training of one or more models of the media segment identifier 160 can be simplified and/or improved. For example, in some implementations, the media output segment identifier 162 is a high-dimensional (e.g., thousands or tens of thousands of elements) one-hot vector in which several elements may correspond to similar media output segments. In such implementations, it can be challenging to train two or more models of the media segment identifier 160 monolithically. The staged approach illustrated in FIG. 2 enables training of models of the media segment identifier 160 individually.

Additionally, the multistage approach facilitates use of a transfer learning approach in which models of the media segment identifier 160 can be reused to train new segment matchers 210 for use with different sets of media output data. To illustrate, after initially training the feature extractor 202, the utterance classifier 206, and a first instance of the segment matcher 210, the feature extractor 202 and the utterance classifier 206 can be used to facilitate training of a second instance of the segment matcher 210. In this illustrative example, the first instance of the segment matcher 210 may be configured to generate a media output segment identifier 162 that maps to a first set of media output segments, and the second instance of the segment matcher 210 may be configured to generate a media output segment identifier 162 that maps to a second set of media output segments. Thus, computing resources are conserved when training models of the media segment identifier 160 based on different sets of media output segments.

In some implementations, the media segment identifier 160, the segment mapper 164, or both, are configured to receive one or more constraints 250 as input, and to cause the output media stream 140 to be generated based on the constraint(s) 250. The constraint(s) 250 may be user specified (e.g., based on a user configurable setting of the device 102 or the device 152 of FIG. 1). To illustrate, the constraint(s) 250 may indicate a particular type of voice or audio modification that is to be performed to generate the output media stream 140. As one example, the constraint(s) 250 may indicate a desired speech characteristic of output speech (e.g., a gender, an accent, voice or unvoiced speech, etc.), in which case the media segment identifier 160 and/or the segment mapper 164 operate to select the media output segment(s) 166 to have the desired speech characteristic. As another example, the constraint(s) 250 may indicate a particular talker's voice (e.g., a speech of a particular person) for the output speech, in which case the media segment identifier 160 and/or the segment mapper 164 operate to select the media output segment(s) 166 that include speech content of the particular person.

Figure 3:
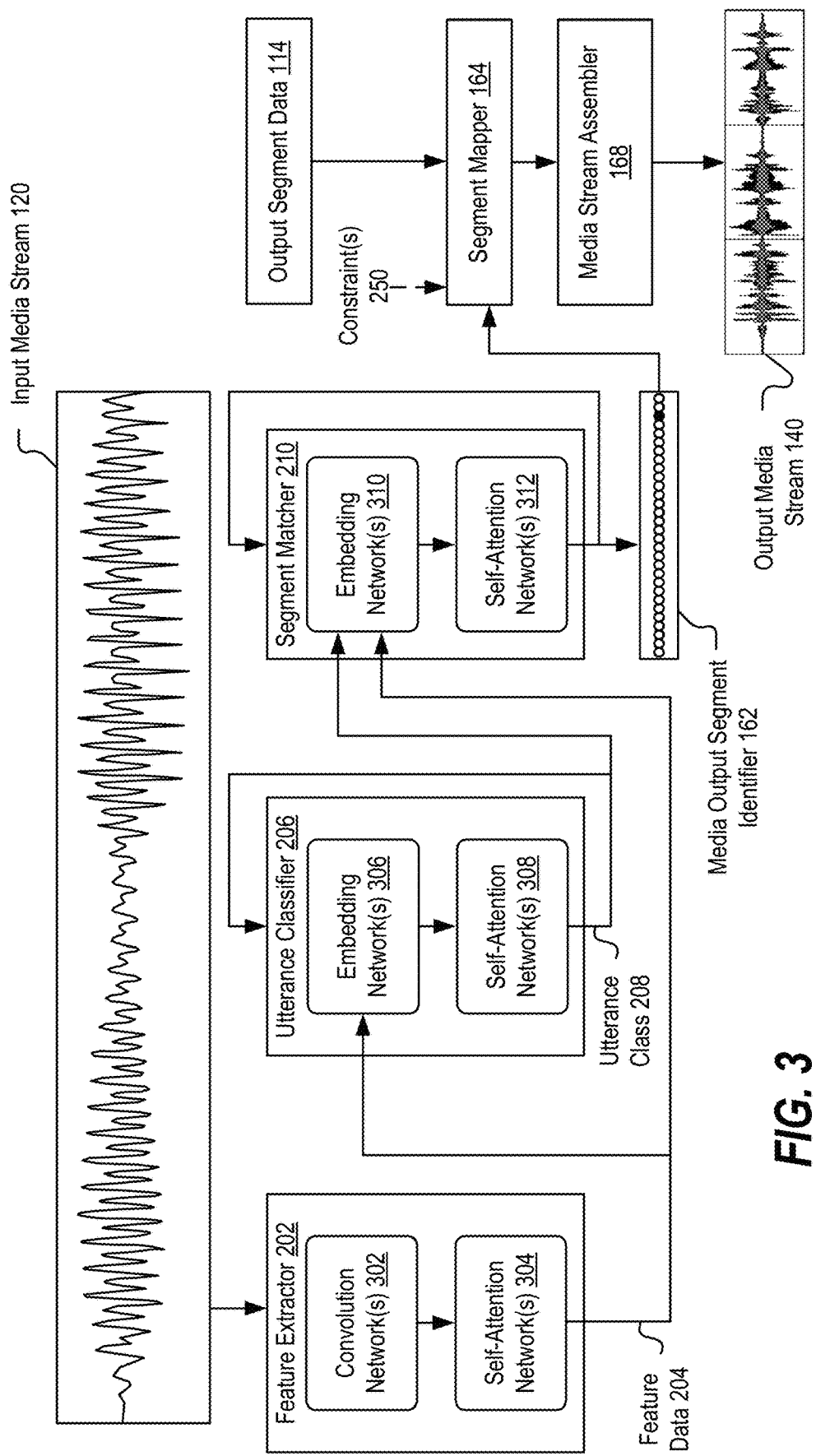
FIG. 3 is a diagram of particular aspects of the system of FIG. 1, in accordance with some examples of the present disclosure.

FIG. 3 is a diagram of particular aspects of the system of FIG. 1, in accordance with some examples of the present disclosure. In particular, FIG. 3 illustrates examples of the input media stream 120, the media segment identifier 160, the media output segment identifier 162, the segment mapper 164, the media stream assembler 168, and the output media stream 140. FIG. 3 further illustrates details of the feature extractor 202, the utterance classifier 206, and the segment matcher 210 according to a particular implementation.

In the example illustrated in FIG. 3, the feature extractor 202 includes one or more convolution networks 302 and one or more self-attention networks 304. As an example, the convolution network(s) 302 include or correspond to one or more two-dimensional (2D) convolution layers. In a particular implementation, the self-attention network(s) 304 include one or more multi-head (e.g., ×6) attention networks, such as one or more transformer networks.

In the example illustrated in FIG. 3, the utterance classifier 206 includes one or more embedding networks 306 and one or more self-attention networks 308. As an example, the embedding network(s) 306 include or correspond to the embedding network typically used in a transformer network. In a particular implementation, the self-attention network(s) 308 include one or more multi-head (e.g., ×12) attention networks, such as one or more transformer networks. In the example of FIG. 3, an output of the utterance classifier 206 is fed back into the utterance classifier 206 during a subsequent iteration. For example, a first set of feature data 204 is passed to the utterance classifier 206 to generate a first utterance class 208 for the first set of feature data 204. In this example, the first utterance class 208 is passed to the segment matcher 210. Further, in this example, the first utterance class 208 is provided, along with a second set of feature data 204, as input to the utterance classifier 206 to generate a second utterance class 208 for the second set of feature data 204.

In the example illustrated in FIG. 3, the segment matcher 210 includes one or more embedding networks 310 and one or more self-attention networks 312. As an example, the embedding network(s) 310 include or correspond to the embedding network typically used in a transformer network. In a particular implementation, the self-attention network(s) 312 include one or more multi-head (e.g., ×12) attention networks, such as one or more transformer networks. In the example, of FIG. 3, an output of the segment matcher 210 is fed back into the segment matcher 210 during a subsequent iteration. For example, a first utterance class 208 and a first set of feature data 204 are passed to the segment matcher 210 to generate a first media output segment identifier 162 for the first set of feature data 204. In this example, the first media output segment identifier 162 is output by the segment matcher 210. Further, in this example, the first media output segment identifier 162 is provided, along with a second utterance class 208 and a second set of feature data 204 as input to the segment matcher 210 to generate a second media output segment identifier 162 for the second set of feature data 204.

The media output segment identifier 162 from the segment matcher 210 is provided to the segment mapper 164, as described above. The segment mapper 164 uses the media output segment identifier 162 (and optionally the constraint(s) 250) to access or generate one or more media output segments, which are provided to the media stream assembler 168 to generate the output media stream 140.

Figure 4:
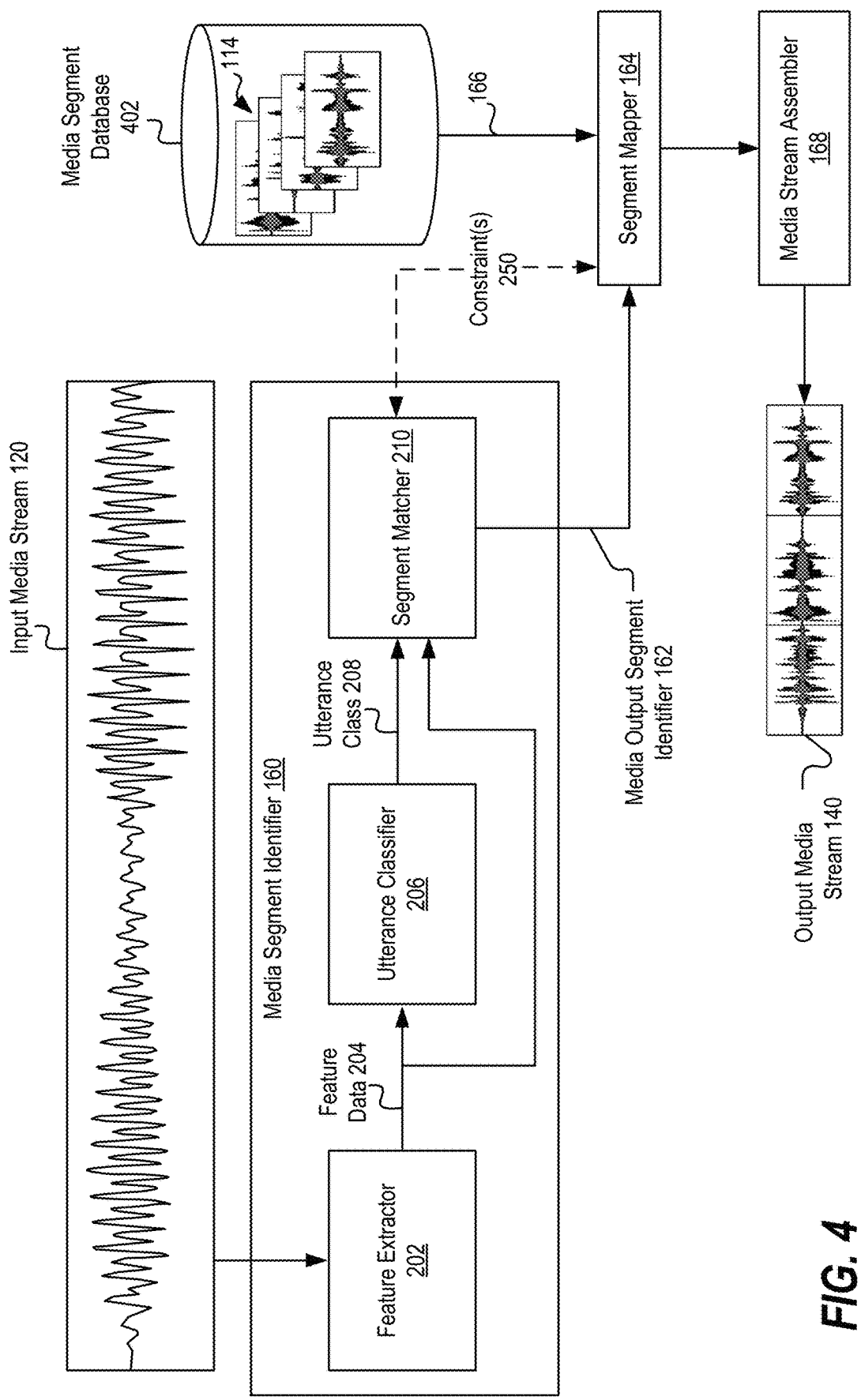
FIG. 4 is a diagram of particular aspects of the system of FIG. 1, in accordance with some examples of the present disclosure.

FIG. 4 is a diagram of particular aspects of the system of FIG. 1, in accordance with some examples of the present disclosure. In particular, FIG. 4 highlights a first example of operation of the segment mapper 164 according to a particular implementation.

FIG. 4 also illustrates examples of the media segment identifier 160 and the media stream assembler 168, each of which may include the features and/or perform the operations described with respect to any of FIGS. 1-3. For example, in FIG. 4, the media segment identifier 160 includes the feature extractor 202, which is configured to generate the feature data 204 based on one or more segments of the input media stream 120. Additionally, in FIG. 4, the media segment identifier 160 includes the utterance classifier 206, which is configured to receive the feature data 204 and generate an utterance class 208 corresponding to the feature data 204. Further, in FIG. 4, the media segment identifier 160 includes the segment matcher 210, which is configured to receive the feature data 204 and the corresponding utterance class 208 and to generate the media output segment identifier 162 corresponding to the feature data 204.

In the example illustrated in FIG. 4, the segment mapper 164 is configured to access a media segment database 402 to retrieve a media output segment 166 that corresponds to the media output segment identifier 162. In this example, the media segment database 402 includes the output segment data 114, which in this example includes segments of recorded media content, such as speech, video of facial movements during speech, etc. Each of the segments of recorded media content represents a recording of a human talker uttering a particular sound (e.g., a phoneme, a set of phonemes, or some other utterance segment). For example, the segments of recorded media content may be derived from one or more recordings of a particular talker, and the segments of recorded media content can be selectively rearranged to generate the output media stream 140 representing different speech content than the original recording(s) of the particular talker.

The media output segment identifier 162 in the example of FIG. 4 corresponds to or can be used (e.g., in combination with the constraint(s) 250) to determine a unique identifier for a particular media output segment 166 from among the output segment data 114. For example, the segment mapper 164 performs a database lookup using the media output segment identifier 162 to retrieve the media output segment 166.

While a single media segment database 402 is illustrated in FIG. 4, in some implementations, the segment mapper 164 may be configured to retrieve media output segments from two or more different media segment databases 402. Additionally, or alternatively, each media segment database 402 may store segments of recorded media content representing recordings of two or more people (e.g., talker_1 to talker_M, where M is an integer greater than 1). In such implementations, the segment mapper 164 may access media output segments associated with particular people based on information indicated in the media output segment identifier 162. Optionally, in some implementations, the segment mapper 164 may access media output segments associated with particular people based on the constraint(s) 250. For example, the constraint(s) 250 may indicate whether the output media stream 140 should include speech from a first person (e.g., a male speaker) or from a second person (e.g., a female speaker). As another example, the constraint(s) 250 may indicate that speech from multiple speakers is to be mixed to generate the output media stream 140. In other examples, other voice modification or voice selection preferences can be indicated via the constraint(s) 250.

Figure 5:
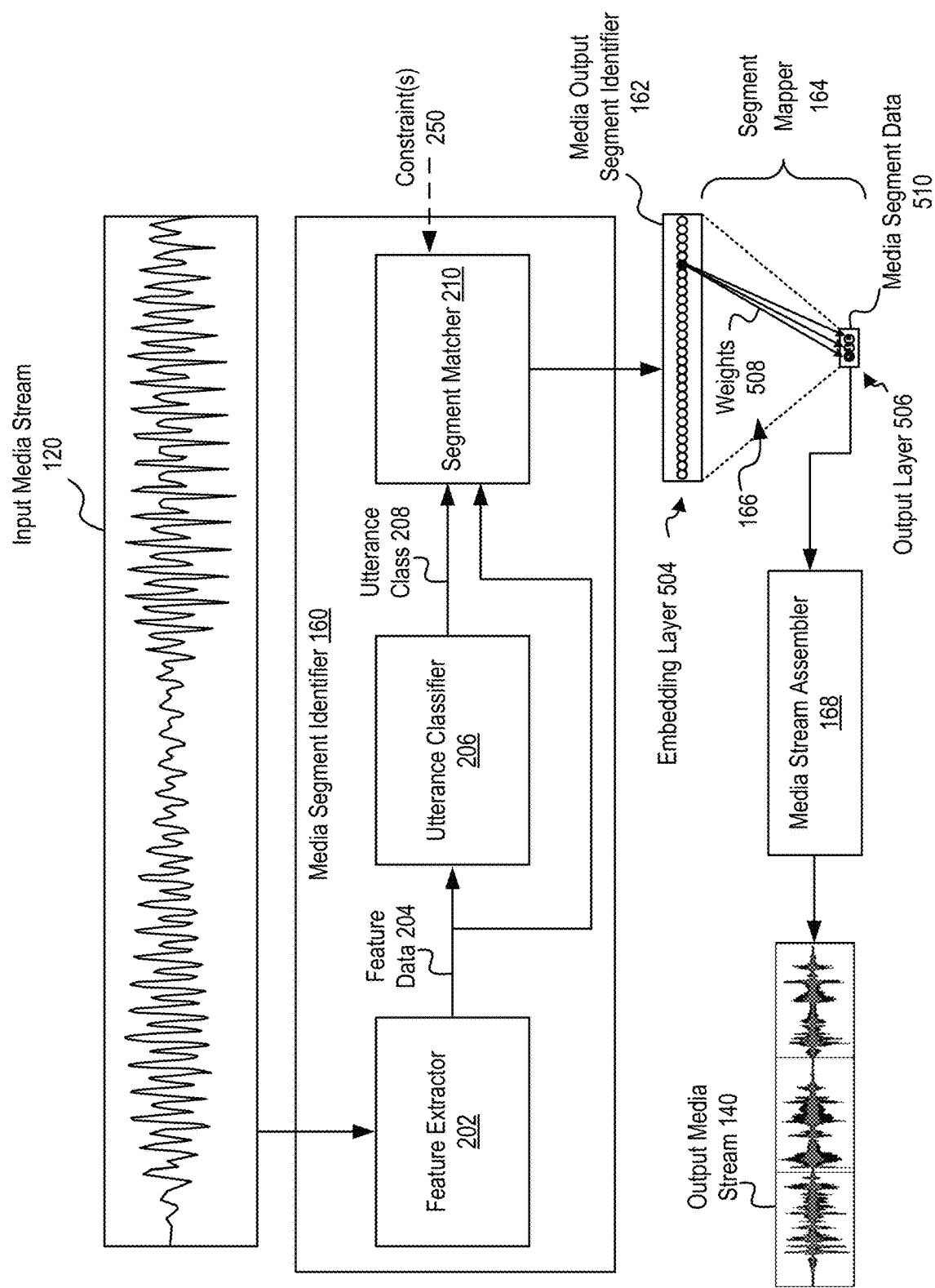
FIG. 5 is a diagram of particular aspects of the system of FIG. 1, in accordance with some examples of the present disclosure.

FIG. 5 is a diagram of particular aspects of the system of FIG. 1, in accordance with some examples of the present disclosure. In particular, FIG. 5 highlights a second example of operation of the segment mapper 164 according to a particular implementation.

FIG. 5 also illustrates examples of the media segment identifier 160 and the media stream assembler 168, each of which may include the features and/or perform the operations described with respect to any of FIGS. 1-3. For example, in FIG. 5, the media segment identifier 160 includes the feature extractor 202, which is configured to generate the feature data 204 based on one or more segments of the input media stream 120. Additionally, in FIG. 5, the media segment identifier 160 includes the utterance classifier 206, which is configured to receive the feature data 204 and generate an utterance class 208 corresponding to the feature data 204. Further, in FIG. 5, the media segment identifier 160 includes the segment matcher 210, which is configured to receive the feature data 204 and the corresponding utterance class 208, and to generate the media output segment identifier 162 corresponding to the feature data 204. Optionally, the media segment identifier 160 may also receive the constraint(s) 250, in which case the media output segment identifier 162 is selected based on the constraint(s) 250.

In the example illustrated in FIG. 5, the segment mapper 164 is configured to generate media segment data 510 of a media output segment 166 that corresponds to the media output segment identifier 162. In this example, the segment mapper 164 corresponds to or includes one or more layers of a neural network. For example, the media output segment identifier 162 is indicated by an activated node of an embedding layer 504. In this example, the embedding layer 504 is a one-hot encoding layer; thus, the media output segment identifier 162 is a one-hot vector or one-hot array. The embedding layer 504 may correspond to an output layer of the segment matcher 210, or the embedding layer 504 may be coupled to the output layer of the segment matcher 210.

The segment mapper 164 also includes an output layer 506 that is coupled to the embedding layer 504 via one or more links. To illustrate, the output layer 506 may be fully connected to the embedding layer 504. In this illustrative example, each node of the output layer 506 is connected, via a respective link, to every node of the embedding layer 504, and each link between the embedding layer 504 and the output layer 506 is associated with a respective link weight. In FIG. 5, one set of link weights (weights 508) is illustrated between one node of the embedding layer 504 and the nodes of the output layer 506; however, every other node of the embedding layer 504 is also connected to the output layer 506 via links associated with respective link weights.

Each set of link weights in the example of FIG. 5 corresponds to parameters of a respective media output segment. To illustrate, in FIG. 5, the weights 508 are parameters of the media output segment 166, which is indicated by that media output segment identifier 162. As one example, the weights 508 indicate PCM parameter values of the media output segment 166.

In a particular example, during operation, the segment mapper 164 calculates a value of the media segment data 510 for each node of the output layer 506, where the value for a particular node corresponds to one (1) times the weights associated with an activated node of the embedding layer 504 plus zero (0) times the weights associated with each other node of the embedding layer 504. Thus, in this example, each value of the media segment data 510 corresponds to a value of the weights 508.

In this particular example, since the weights 508 correspond to values of the media segment data 510, each set of weights of the segment mapper 164 can be viewed as a memory unit, and the media output segment identifier 162 can be viewed as a unit index identifying a particular memory unit of the segment mapper 164.

Figure 6:
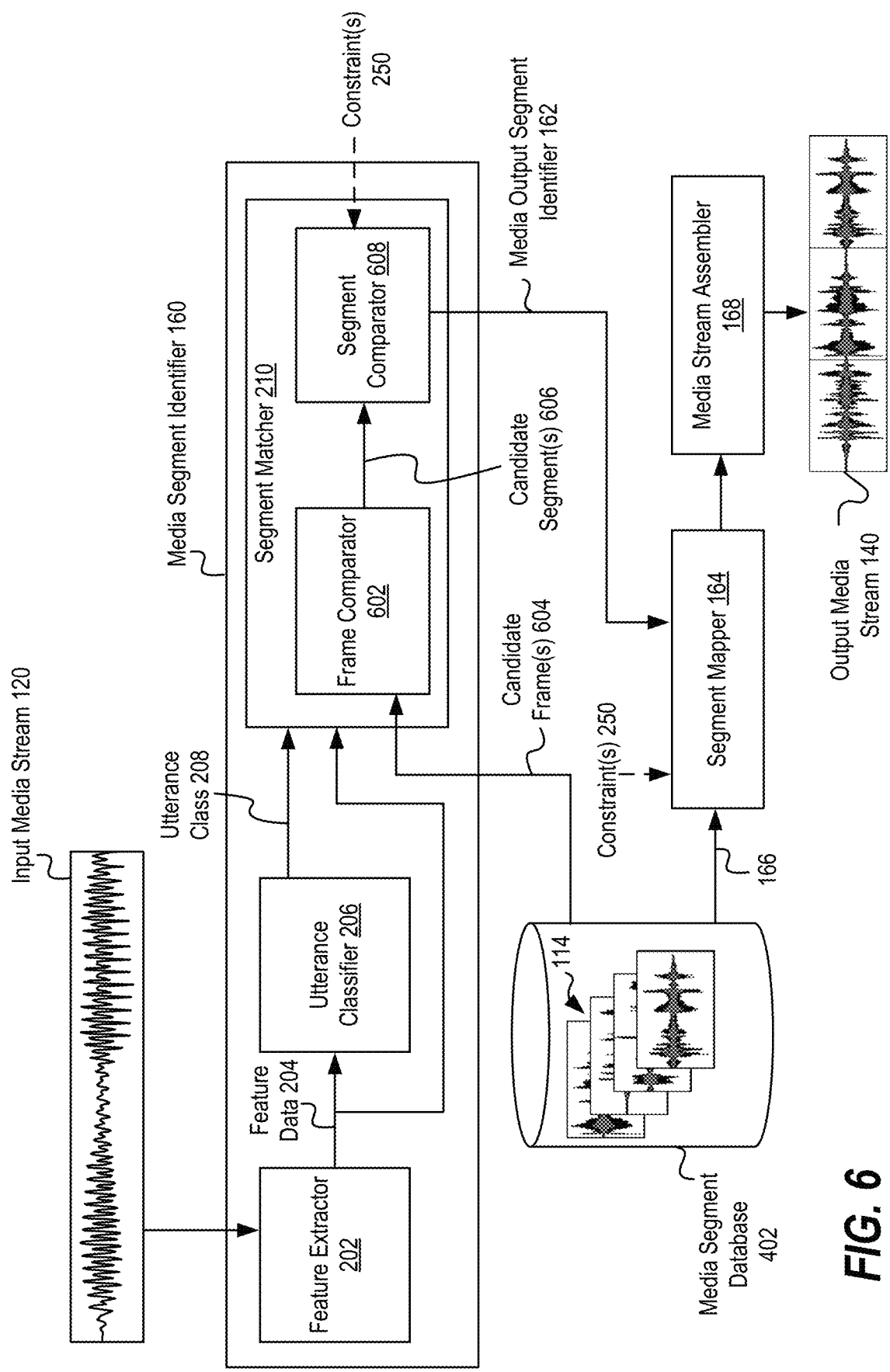
FIG. 6 is a diagram of particular aspects of the system of FIG. 1, in accordance with some examples of the present disclosure.

FIG. 6 is a diagram of particular aspects of the system of FIG. 1, in accordance with some examples of the present disclosure. In particular, FIG. 6 illustrates examples of the input media stream 120, the media segment identifier 160, the media output segment identifier 162, the segment mapper 164, the media stream assembler 168, and the output media stream 140.

In the example illustrated in FIG. 6, the media segment identifier 160 includes the feature extractor 202, the utterance classifier 206, and the segment matcher 210. The feature extractor 202 is coupled to the utterance classifier 206 and the segment matcher 210 and is configured to generate feature data 204 representing a portion of the input media stream 120. For example, one or more segments of the input media stream 120 may be input into the feature extractor 202 to generate the feature data 204 corresponding to the one or more segments of the input media stream 120. As explained with reference to FIG. 1, the input media stream 120 may include data representing speech and optionally may include data representing other content, such as other sounds and/or images.

In some implementations, the feature extractor 202 of FIG. 6 includes or corresponds to one or more trained models (e.g., a machine-learning model, such as the convolution network 302 and the self-attention network 304 of FIG. 3), as described above. In other implementations, the feature extractor of FIG. 6 includes or corresponds to an audio processor that is configured to extract speech parameters from audio content. In such implementations, the feature data 204 includes data representing the speech parameters. Non-limiting examples of such speech parameters include speech energy, pitch, duration, spectral representation, talker identity, talker gender, spectral envelope, one or more other measurable or quantifiable parameters representing speech, or combinations thereof. In still other implementations, the feature extractor of FIG. 6 includes one or more trained models and an audio processor. In such implementations, the feature data 204 may include a feature vector and speech parameters.

In the example illustrated in FIG. 6, the feature data 204 is passed to the utterance classifier 206. The utterance classifier 206 is configured to determine the utterance class 208 associated with the segment(s) of the input media stream 120 represented by the feature data 204. The utterance class 208 associated with the segment(s) is one of a plurality of utterance classes, the specific number and nature of which depends on the configuration of the media segment identifier 160. As one example, each utterance class can include a phoneme label identifying a phoneme or a set of phonemes identified in an input segment of the input media stream 120. In this example, the particular utterance class 208 indicated by the utterance classifier 206 is an estimate of which phoneme(s) are represented by the segment(s) of the input media stream 120 represented by the feature data 204. In other examples, the utterance classes represent biphones or other groupings of human-made sounds.

In the example illustrated in FIG. 6, the feature data 204 and the utterance class 208 associated with the feature data 204 are passed to the segment matcher 210. In some implementations, additional information is provided to the segment matcher 210. For example, in FIG. 6, data representing a set of candidate frames 604 are provided to the segment matcher 210. In this example, each candidate frame 604 corresponds to a portion of a respective media output segment of the output segment data 114. Optionally, data specifying the constraint(s) 250 may also be provided to the segment matcher 210.

The segment matcher 210 is configured to determine the media output segment identifier 162 based on the feature data 204 and the utterance class 208. In the example illustrated in FIG. 6, the segment matcher 210 includes a frame comparator 602 and a segment comparator 608. In this example, the frame comparator 602 and the segment comparator 608 are configured to operate cooperatively to determine the media output segment identifier 162.

The frame comparator 602 is configured to compare one or more candidate frames 604 to data representing one or more input frames of the input media stream 120 to determine one or more candidate segments 606. In some implementations, the segment matcher 210 is configured to obtain data representing the one or more candidate frames 604 of a media output segment based on the utterance class 208 and utterance classes of the output segment data 114. To illustrate, the frame comparator 602 may query the output segment data 114 to identify media output segments that include frames associated with the utterance class 208. In this illustrative example, the frame comparator 602 compares data representing the candidate frames 604 to the feature data 204 representing one or more frames of the input media stream 120 to determine which of the candidate frames are most similar to the frame(s) of the input media stream 120. One or more output media segments associated with the most similar candidate frames 604 are provided to the segment comparator 608 as candidate segments 606.

In some implementations, as described further below, the feature data 204 representing an input frame of the input media stream 120 includes values of speech parameters for the input frame. In such implementations, the frame comparator 602 compares the values of the speech parameters for the input frame and values of speech parameters for the candidate frames 604 to select the candidate frames that are most similar to the frame of the input media stream 120. In some implementations, as described further below, the feature data 204 representing an input frame of the input media stream 120 includes an embedding (e.g., a feature vector, a feature array, or a feature map) representing the input frame. In such implementations, the frame comparator 602 compares the embedding representing the input frame and embeddings representing the candidate frames 604 to select the candidate frames that are most similar to the frame of the input media stream 120.

In a particular implementation in which the feature data 204 includes values of speech parameters for the input frame, the feature data 204 for the input frame may include multiple speech parameter values, such as a pitch of the frame, a spectral representation of the frame, an energy of the frame, a duration of the frame, etc. In this implementation, the media segment database 402 may include corresponding speech parameter values for each output frame of each output media segment of the output segment data 114, and the frame comparator 602 obtains the speech parameter values of the output frames from the media segment database 402. Alternatively, if the media segment database 402 does not include the corresponding speech parameter values for each output frame, the frame comparator 602 or the feature extractor 202 may determine the corresponding speech parameter values of the output frames.

In this particular implementation, the frame comparator 602 compares the values of the speech parameters for the input frame and the values of the speech parameters for the candidate frames 604. In this particular implementation, the frame comparator 602 determines a frame match score for each candidate frame 604, where the frame match score indicates how similar the candidate frame 604 is to the input frame based on the values of the speech parameters. To illustrate, the frame comparator 602 may determine a difference value for each of two or more speech parameters and may aggregate the difference values to generate the frame match score for a particular candidate frame 604. In some examples, the difference values are scaled, normalized, weighted, or otherwise transformed before being aggregated. To illustrate, the difference values may be adjusted such that each falls within a range from 0 to 1, and an average or weighted average of the adjusted difference values may be calculated to aggregate the adjusted difference values to generate the frame match score. In other examples, other similarity statistics are calculated to generate the frame match score for each candidate frame 604.

The candidate frames 604 in this particular implementation may include each output frame of the media segment database 402 or may include a subset of the output frames of the media segment database 402, such as only those output frames that satisfy the constraint(s) 250. For example, the frame comparator 602 may determine a frame match score based on speech parameter values for each output frame of the media segment database 402 (or each output frame that satisfies the constraint(s) 250) irrespective of the utterance class 208 of the input frame and the utterance classes of the output frames. In this example, the segment comparator 608 compares the utterance class 208 of one or more input frames to utterance classes of the candidate segments 606 during determination of the media output segment identifier 162. In another example, the frame comparator 602 may determine a frame match score based on speech parameter values for each output frame of the media segment database 402 that matches the utterance class 208 of the input frame. Optionally, the frame comparator 602 may determine a frame match score based on speech parameter values for each output frame of the media segment database 402 that both matches the utterance class 208 of the input frame and satisfies the constraint(s) 250.

In a particular implementation in which the feature data 204 includes the embedding representing the input frame, the frame comparator 602 may include a trained machine-learning model that is configured to compare the embedding representing the input frame and an embedding representing each candidate frame 604 to assign a frame match score to the candidate frame 604. For example, the segment matcher 210 may pass output of the feature extractor 202 (e.g., the feature data 204) and data representing a particular candidate frame 604 into a trained machine-learning model to cause the trained machine-learning model to output the frame match score for the particular candidate frame 604. Embeddings representing the candidate frames 604 may be precomputed and stored in the media segment database 402, or the candidate frames 604 can be provided to the feature extractor 202 to generate the embeddings at runtime.

The candidate frames 604 in this implementation may include each output frame of the media segment database 402 or may include a subset of the output frames of the media segment database 402, such as only those output frames that satisfy the constraint(s) 250. For example, the frame comparator 602 may determine a frame match score based on embeddings representing each output frame of the media segment database 402 (or each output frame that satisfies the constraint(s) 250) irrespective of the utterance class 208 of the input frame and the utterance classes of the output frames. In this example, the segment comparator 608 compares the utterance class 208 of one or more input frames to utterance classes of the candidate segments 606 during determination of the media output segment identifier 162. In another example, the frame comparator 602 may determine a frame match score based on an embedding representing each output frame of the media segment database 402 that matches the utterance class 208 of the input frame. Optionally, the frame comparator 602 may determine a frame match score for each output frame of the media segment database 402 that both matches the utterance class 208 of the input frame and satisfies the constraint(s) 250.

The frame match score (whether based on values of speech parameters or based on comparisons of embeddings) of each candidate frame 604 indicates an estimate of similarity of the candidate frame 604 to the input frame. The frame comparator 602 determines the candidate segments 606 based on which output segments of the media segment database 402 are associated with candidate frames 604 having the largest frame match scores. In some implementations, the frame comparator 602 may also apply the constraint(s) 250 when determining the candidate segments 606.

In the example illustrated in FIG. 6, the segment comparator 608 is configured to determine a segment match score for each of the one or more candidate segments 606. The segment match score of a particular candidate segment 606 indicates an estimate of similarity of the particular candidate segment to an input segment represented by the output of the feature extractor 202 (e.g., the feature data 204). The segment matcher 210 is configured to determine the media output segment identifier 162 based, at least partially, on the segment match scores. For example, in some implementations, the segment matcher 210 determines the media output segment identifier 162 based on the segment match scores and the constraint(s) 250. In other implementations, the segment matcher 210 determines the media output segment identifier 162 based on the segment match scores alone. To illustrate, the media output segment identifier 162 may identify a media output segment associated with a largest segment match score among the candidate segments 606.

Figure 7:
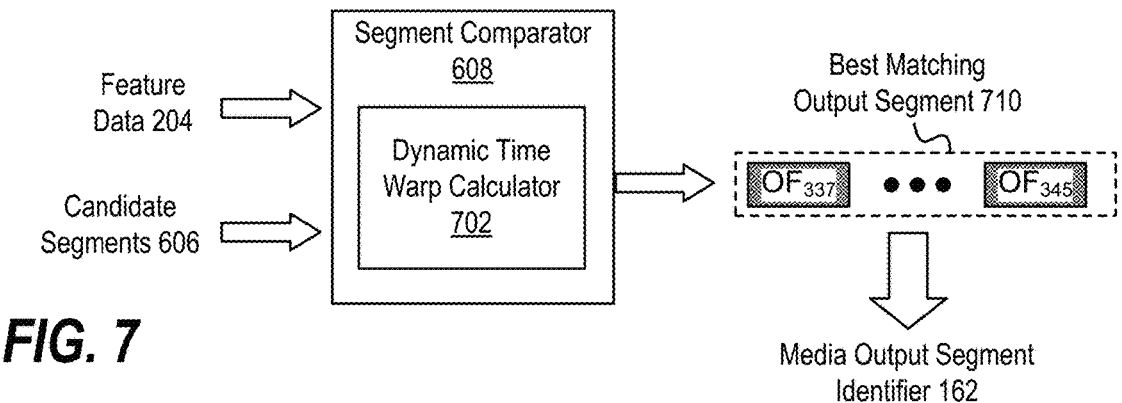
FIG. 7 is a diagram illustrating particular aspects of operations performed by a segment matcher of the system of FIG. 1 to generate and use a media output segment identifier based on an input media stream, in accordance with some examples of the present disclosure.

In a particular implementation, illustrated in FIG. 7, the segment comparator 608 is configured to determine the segment match score of the particular candidate segment based on dynamic time warping of data representing the particular candidate segment and data representing the input segment (e.g., the feature data 204). For example, in FIG. 7, the segment comparator 608 includes a dynamic time warp calculator 702. The dynamic time warp calculator 702 is configured to determine a segment match score for a particular candidate segments 606 based on dynamic time warp calculations comparing the data representing the input segment and the data representing the particular candidate segment 606. In this example, the segment comparator 608 selects a best matching output segment 710 from among the candidate segments 606 and outputs an identifier of the best matching output segment 710 as the media output segment identifier 162. Using dynamic time warping, the best matching output segment 710 corresponds to a candidate segment 606 with the least cost (e.g., shortest total distance) warping path relative to the input segment.

Figure 8:
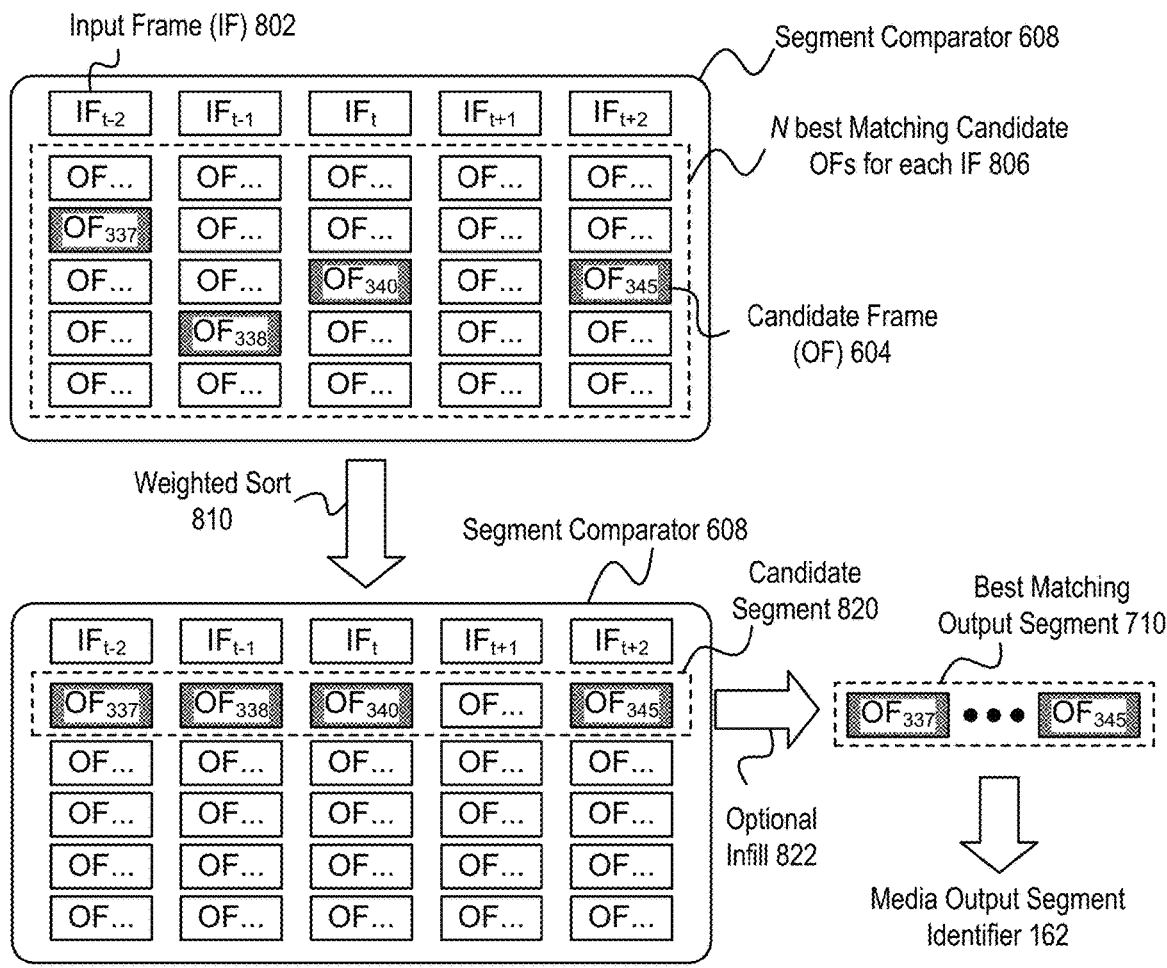
FIG. 8 is a diagram illustrating particular aspects of operations performed by a segment matcher of the system of FIG. 1 to generate and use a media output segment identifier based on an input media stream, in accordance with some examples of the present disclosure.

In another particular implementation, illustrated in FIG. 8, the segment comparator 608 is configured to determine the best matching output segment 710 based on identification of a candidate segment 820 associated with a set of output frames (abbreviated "OF" in FIG. 8) that have relatively high frame match scores. To illustrate, in the example illustrated in FIG. 8, an input segment includes a sequence of input frames (abbreviated "IF" in FIG. 8) including $IF_{t-2}$, $IF_{t-1}$, $IF_t$, $IF_{t+1}$, and $IF_{t+2}$. In this example, the segment comparator 608 accumulates (e.g., stores to a buffer) a list 806 of the M best matching candidate frames 604 for each input frame 802, where M is an integer greater than 1 and may be a default or configurable parameter. In some implementations, the list 806 associated with each input frame 802 is sorted based on the frame match score associated with each candidate frame 604.

Periodically or occasionally (e.g., when an end of an input segment is reached), the segment comparator 608 performs a weighted sort 810 of frame matching scores of the lists 806. For example, the frame matching scores may be weighted based on feedback from a prior output of the segment comparator 608, results of comparisons of the utterance class 208 associated with an input frame 802 and utterance classes associated with the candidate frames 604, or both. In some implementations, the frame matching scores are also weighted based on memory locations at which the candidate frames 604 are stored in the media segment database 402. For example, output frames may be stored in the media segment database 402 in their recorded order. To illustrate, each output frame is associated with a memory unit index that indicates a storage location of the output frame in the media segment database 402, and the memory unit indices increase monotonically and sequentially for output frames that represent a particular sequence of captured audio data. In this example, the weighted sort 810 weights the frame match scores of the candidate frames 604 to favor sequences of candidate frames 604, where a sequence of candidate frames 604 includes candidate frames 604 associated with monotonically increasing memory unit indices. In some examples, the weighting may also account for spacing between the memory unit indices. To illustrate, memory unit indices with greater than a threshold separation may be treated as non-sequential, and therefore, not favorably weighted.

In a particular aspect, the best matching output segment 710 corresponds to a highest ranked set of candidate segments 820 after the weighted sort 810. In some implementations, the highest ranked set of candidate segments 820 may not represent a complete sequence of output frames. For example, in FIG. 8, output frames with grey shading correspond to a sequence, and an output frame that is the highest ranked for the input frame $IF_{t+1}$ is not part of the sequence. In this situation, the segment comparator 608 may perform an optional infill operation 822 to complete the sequence of output frames. To illustrate, having identified the candidate segment 820 as the highest ranked segment, the segment comparator 608 may select the entire candidate segment 820 as the best matching output segment 710. In this illustrative example, the best matching output segment 710 may include output frames that were not among the candidate frames 604 (e.g., output frames that are stored in memory unit locations between a memory unit location associated with an initial output frame ($OF_{337}$ in FIG. 8) of the best matching output segment 710 and a memory unit location associated with a final output frame ($OF_{345}$ in FIG. 8) of the best matching output segment 710.

Returning to FIG. 6, the segment comparator 608 outputs an identifier (e.g., a memory unit index or another identifier) of the best matching output segment 710 as the media output segment identifier 162. The segment mapper 164 uses the media output segment identifier 162 to access or generate one or more media output segments, which are provided to the media stream assembler 168 to generate the output media stream 140. For example, the segment mapper 164 performs a database lookup using the media output segment identifier 162 (and optionally the constraint(s) 250) to retrieve the media output segment 166 from the media segment database 402.

Figure 9:
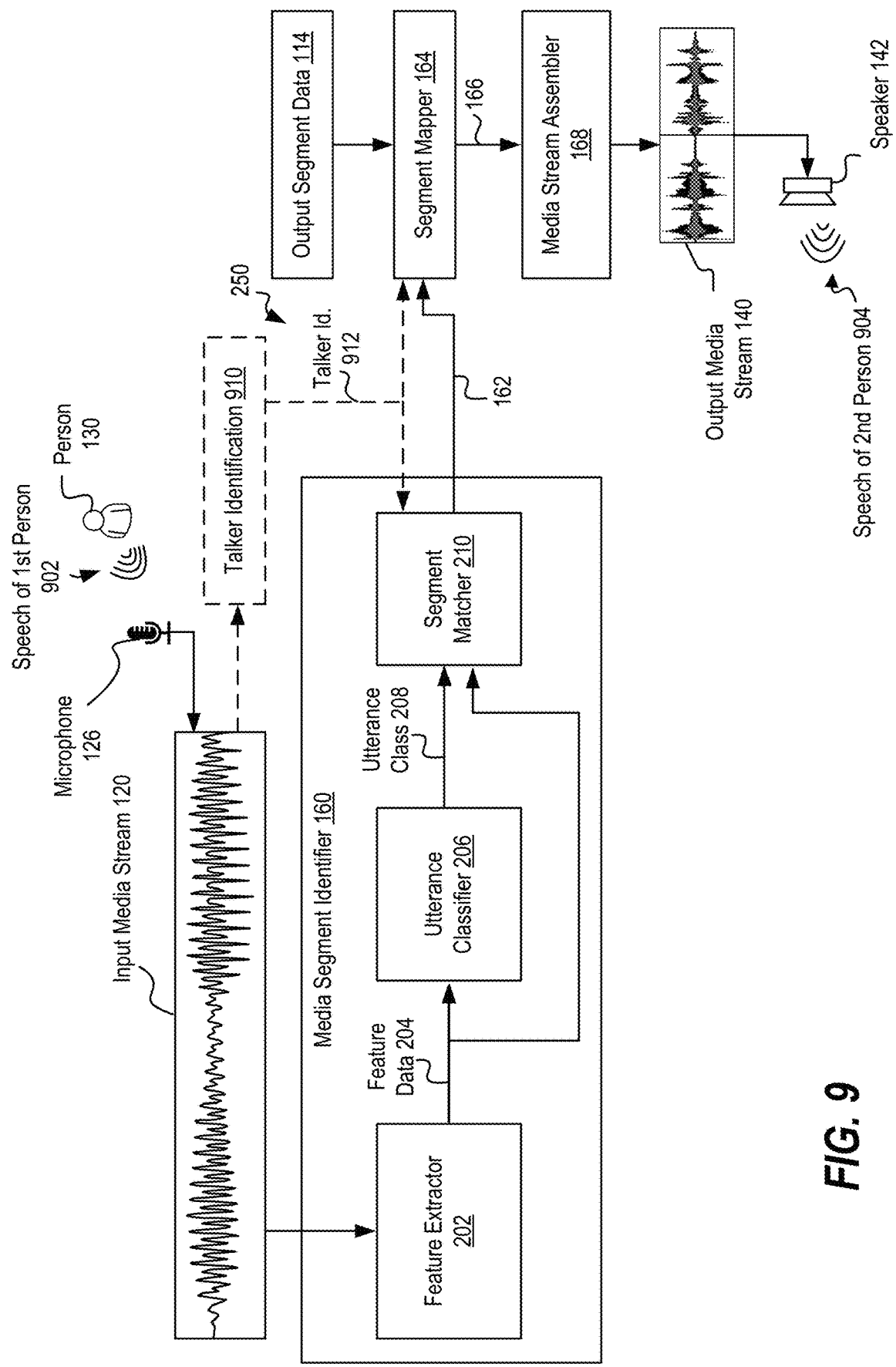
FIG. 9 is a diagram illustrating particular aspects of operations performed by the system of FIG. 1 to generate and use a media output segment identifier based on an input media stream, in accordance with some examples of the present disclosure.

FIG. 9 is a diagram illustrating particular aspects of operations performed by the system of FIG. 1 to generate and use a media output segment identifier based on an input media stream, in accordance with some examples of the present disclosure. In particular, FIG. 9 highlights a first example of voice modification using components of the system 100 in accordance with some implementations.

FIG. 9 illustrates examples of the media segment identifier 160, the segment mapper 164, and the media stream assembler 168, each of which may include the features and/or perform the operations described with respect to any of FIGS. 1-8. For example, in FIG. 9, the media segment identifier 160 includes the feature extractor 202, the utterance classifier 206, and the segment matcher 210. Additionally, the media segment identifier 160 generates data (e.g., the media output segment identifier 162) that is used by the segment mapper 164 and the media stream assembler 168 to generate the output media stream 140.

In the example illustrated in FIG. 9, the input media stream 120 is received via the microphone 126 and includes speech of a first person 902 (e.g., the person 130). In this example, the media segment identifier 160 parses the input media stream 120 into segments and provides the segments as input to the feature extractor 202. The input media stream 120 may be parsed based on time (e.g., such that each segment represents a portion of the input media stream having a specified duration) or based on content of the speech of the first person 902 (e.g., based on sounds present in the speech of the first person 902).

In the example illustrated in FIG. 9, the feature extractor 202 generates the feature data 204 based on one or more segments of the input media stream 120 and passes the feature data 204 to the utterance classifier 206 and to the segment matcher 210. The utterance classifier 206 determines an utterance class 208 associated with the feature data 204 and passes the utterance class 208 to the segment matcher 210. The segment matcher 210 generates the media output segment identifier 162 based on the utterance class 208 and the feature data 204.

Optionally, in the example illustrated in FIG. 9, the input media stream 120 may be processed to determine one or more of the constraint(s) 250. For example, in FIG. 9, the constraint(s) 250 include a talker identifier ("talker id.") 912 indicating a name or other identifier of the first person 130. The talker id. 912 of FIG. 9 may be generated automatically by a talker identification process 910. As one example, the talker identification process 910 may generate the talker id. 912 based on speech characteristics of the first person 130. As another example, the talker identification process 910 may generate the talker id. 912 based on an image of the first person 130 captured by one or more cameras (e.g., the camera 132). In still another example, the talker identification process 910 may generate the talker id. 912 based on credentials provided by the first person 130 during an authentication or authorization process (e.g., when the first person 130 logged onto the device 102 of FIG. 1). Depending on settings (e.g., other constraint(s) 250) associated with the media segment identifier 160 and/or the segment mapper 164, the talker id. 912 may be used to select output media segment identifiers 162 or media output segments 166 that correspond to speech of a second person that sounds like the first person 130, or to select output media segment identifiers 162 or media output segments 166 that correspond to speech of a second person that sounds different from the first person 130.

The segment mapper 164 retrieves or generates a media output segment 166 based on the media output segment identifier 162. In the example illustrated in FIG. 9, the media output segment 166 corresponds to a segment of pre-recorded speech of another person (e.g., a second person distinct from the person 130) making one or more sounds corresponding to sound(s) of the segment of the input media stream 120 represented by the media output segment identifier 162. The media output segment 166 is provided to the media stream assembler 168, along with other media segments to generate the output media stream 140. In the example of FIG. 9, the output media stream 140 is played out by the speaker 142 as output representing speech of a second person 904. Thus, the speech of the first person 902 is used to generate corresponding speech of a second person 904 (e.g., to perform voice conversion).

Figure 10:
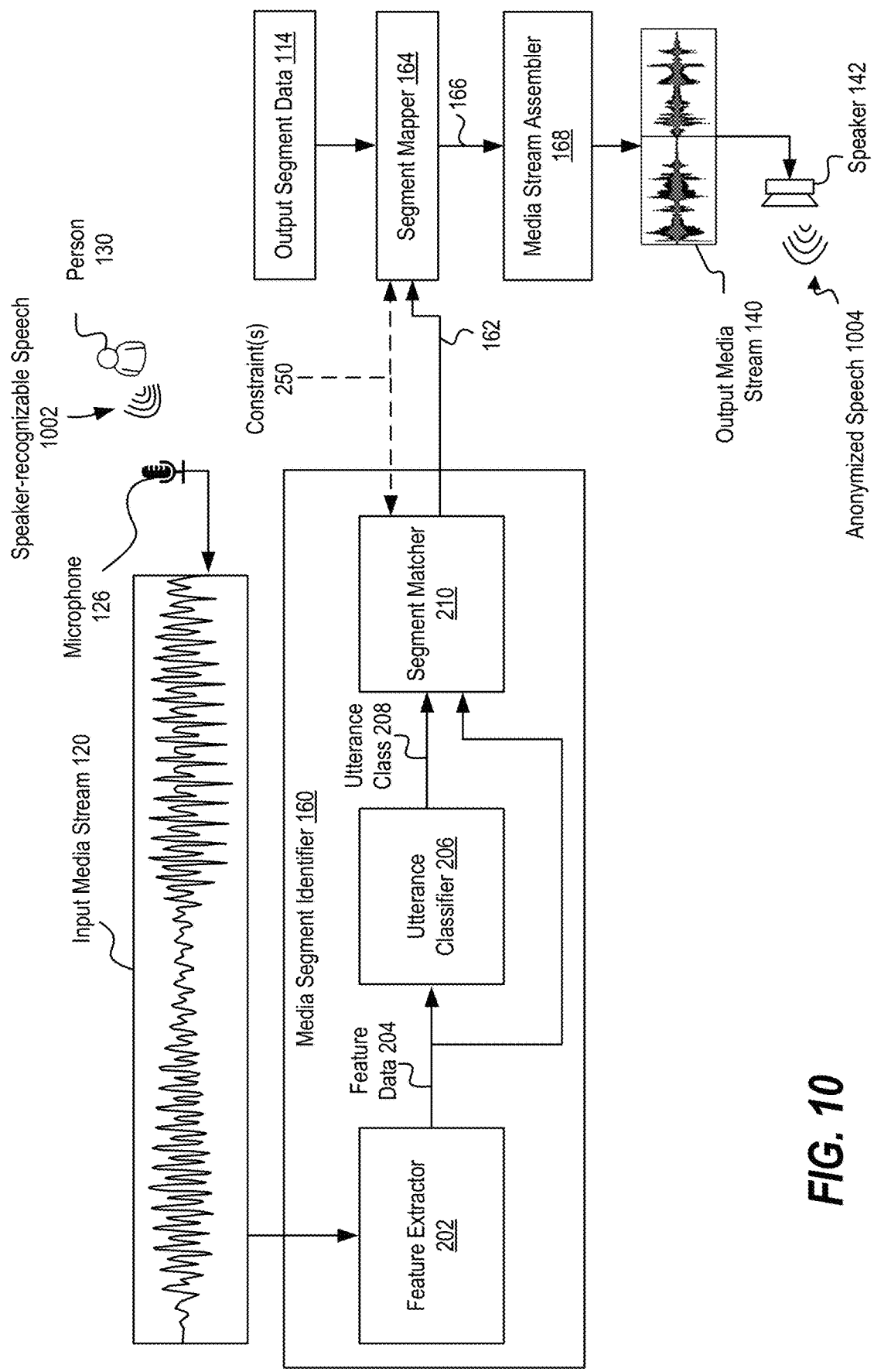
FIG. 10 is a diagram illustrating particular aspects of operations performed by the system of FIG. 1 to generate and use a media output segment identifier based on an input media stream, in accordance with some examples of the present disclosure.

FIG. 10 is a diagram illustrating particular aspects of operations performed by the system of FIG. 1 to generate and use a media output segment identifier based on an input media stream, in accordance with some examples of the present disclosure. In particular, FIG. 10 highlights a second example of voice modification using components of the system 100 in accordance with some implementations.

FIG. 10 illustrates examples of the media segment identifier 160, the segment mapper 164, and the media stream assembler 168, each of which may include the features and/or perform the operations described with respect to any of FIGS. 1-8. For example, in FIG. 10, the media segment identifier 160 includes the feature extractor 202, the utterance classifier 206, and the segment matcher 210. Additionally, the media segment identifier 160 generates data (e.g., the media output segment identifier 162) that is used by the segment mapper 164 and the media stream assembler 168 to generate the output media stream 140.

In the example illustrated in FIG. 10, the input media stream 120 is received via the microphone 126 and includes speaker-recognizable speech 1002 of the person 130. In this example, the media segment identifier 160 parses the input media stream 120 into segments and provides the segments as input to the feature extractor 202. The input media stream 120 may be parsed based on time (e.g., such that each segment represents a portion of the input media stream having a specified duration) or based on content of the speaker-recognizable speech 1002 (e.g., based on sounds present in the speaker-recognizable speech 1002).

In the example illustrated in FIG. 10, the feature extractor 202 generates the feature data 204 based on one or more segments of the input media stream 120 and passes the feature data 204 to the utterance classifier 206 and to the segment matcher 210. The utterance classifier 206 determines an utterance class 208 associated with the feature data 204 and passes the utterance class 208 to the segment matcher 210. The segment matcher 210 generates the media output segment identifier 162 based on the utterance class 208 and the feature data 204. Optionally, the segment matcher 210 may also generate the media output segment identifier 162 based on the constraint(s) 250 (e.g., based on a talker id. 912 of the person 130).

The segment mapper 164 retrieves or generates a media output segment 166 based on the media output segment identifier 162 (and optionally based on the constraint(s) 250). In the example illustrated in FIG. 10, the media segment identifier 160 generates a series of media output segment identifiers 162 based on a series of segments of the input media stream 120, and the segment mapper 164 generates or retrieves media output segments 166 associated with different talkers for different media output segment identifiers 162 of the series of media output segment identifiers 162. For example, the segment mapper 164 may be configured to generate or retrieve first media output segments 166 corresponding to pre-recorded speech of a second person (e.g., a second person distinct from the person 130) and to generate or retrieve second media output segments 166 corresponding to pre-recorded speech of a third person (e.g., a third person distinct from the person 130 and distinct from the second person). In this example, the segment mapper 164 may alternate between the first media output segments 166 and the second media output segments 166. In this example, the output media stream 140, when played out by the speaker 142, represents anonymized speech 1004 that is not recognizable as speech of the person 130 and that is also not recognizable as speech of the second person or as speech of the third person.

Although the example above refers to alternating between the first media output segments 166 associated with speech of a second person and the second media output segments 166 associated with speech of a third person, in other implementations, the segment mapper 164 may change between sets of media output segments 166 associated with more than two different people. Additionally, or alternatively, the segment mapper 164 may change between sets of media output segments 166 in a different pattern than alternating with each media output segment identifier 162. For example, the segment mapper 164 may randomly select, from among a plurality of sets of media output segments associated with different people, a particular set of media output segments from which the media output segment 166 is retrieved or generated based on the media output segment identifier 162. To illustrate, when a media output segment identifier 162 is output by the media segment identifier 160, the segment mapper 164 (or another component of the device 102 of FIG. 1) selects a talker (e.g., a person whose pre-recorded speech is to be used). In this illustrative example, the segment mapper 164 generates or retrieves the media output segment 166 based on the output segment data 114 (shown in FIG. 1) for the selected talker.

Figure 11:
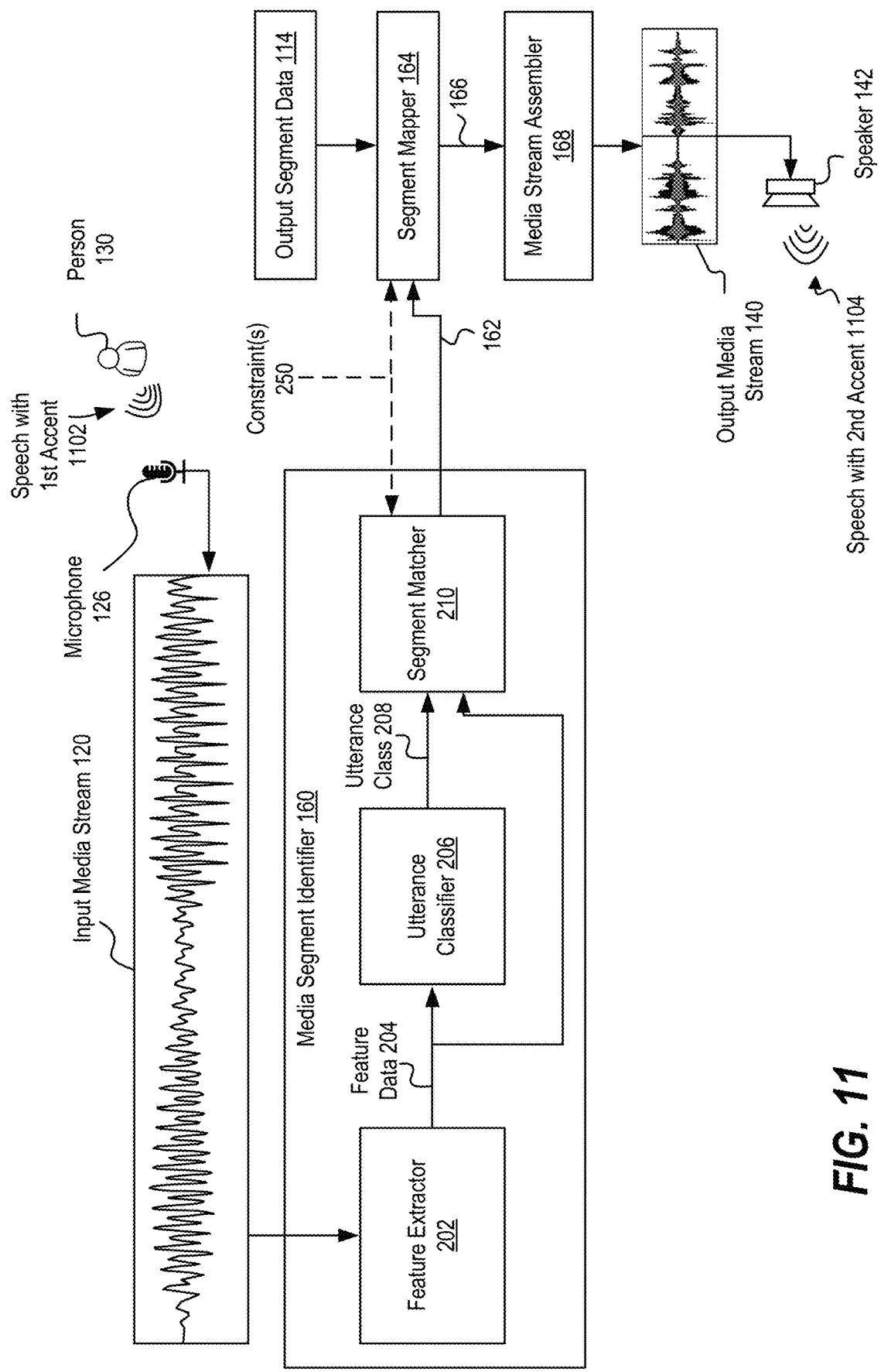
FIG. 11 is a diagram illustrating particular aspects of operations performed by the system of FIG. 1 to generate and use a media output segment identifier based on an input media stream, in accordance with some examples of the present disclosure.

FIG. 11 is a diagram illustrating particular aspects of operations performed by the system of FIG. 1 to generate and use a media output segment identifier based on an input media stream, in accordance with some examples of the present disclosure. In particular, FIG. 11 highlights a third example of voice modification using components of the system 100 in accordance with some implementations.

FIG. 11 illustrates examples of the media segment identifier 160, the segment mapper 164, and the media stream assembler 168, each of which may include the features and/or perform the operations described with respect to any of FIGS. 1-8. For example, in FIG. 11, the media segment identifier 160 includes the feature extractor 202, the utterance classifier 206, and the segment matcher 210. Additionally, the media segment identifier 160 generates data (e.g., the media output segment identifier 162) that is used by the segment mapper 164 and the media stream assembler 168 to generate the output media stream 140.

In the example illustrated in FIG. 11, the input media stream 120 is received via the microphone 126 and includes speech with a first accent 1102 (e.g., speech of the person 130, where the person 130 speaks with the first accent). In this example, the media segment identifier 160 parses the input media stream 120 into segments and provides the segments as input to the feature extractor 202. The input media stream 120 may be parsed based on time (e.g., such that each segment represents a portion of the input media stream having a specified duration) or based on content of the speech with the first accent 1102 (e.g., based on sounds present in the speech with the first accent 1102).

In the example illustrated in FIG. 11, the feature extractor 202 generates the feature data 204 based on one or more segments of the input media stream 120 and passes the feature data 204 to the utterance classifier 206 and to the segment matcher 210. The utterance classifier 206 determines an utterance class 208 associated with the feature data 204 and passes the utterance class 208 to the segment matcher 210. The segment matcher 210 generates the media output segment identifier 162 based on the utterance class 208 and the feature data 204. Optionally, the segment matcher 210 may determine the media output segment identifier 162 further based on the constraint(s) 250.

The segment mapper 164 retrieves or generates a media output segment 166 based on the media output segment identifier 162. In the example illustrated in FIG. 11, the media output segment 166 corresponds to a segment of pre-recorded speech of a person speaking with a second accent (e.g., a second person distinct from the person 130 or the person 130 speaking without the first accent) making one or more sounds corresponding to sound(s) of the segment of the input media stream 120 represented by the media output segment identifier 162. The media output segment 166 is provided to the media stream assembler 168, along with other media segments to generate the output media stream 140. In the example of FIG. 11, the output media stream 140 is played out by the speaker 142 as output representing speech with a second accent 1104. Thus, the speech with the first accent 1102 is used to generate corresponding speech with the second accent 1104.

Figure 12:
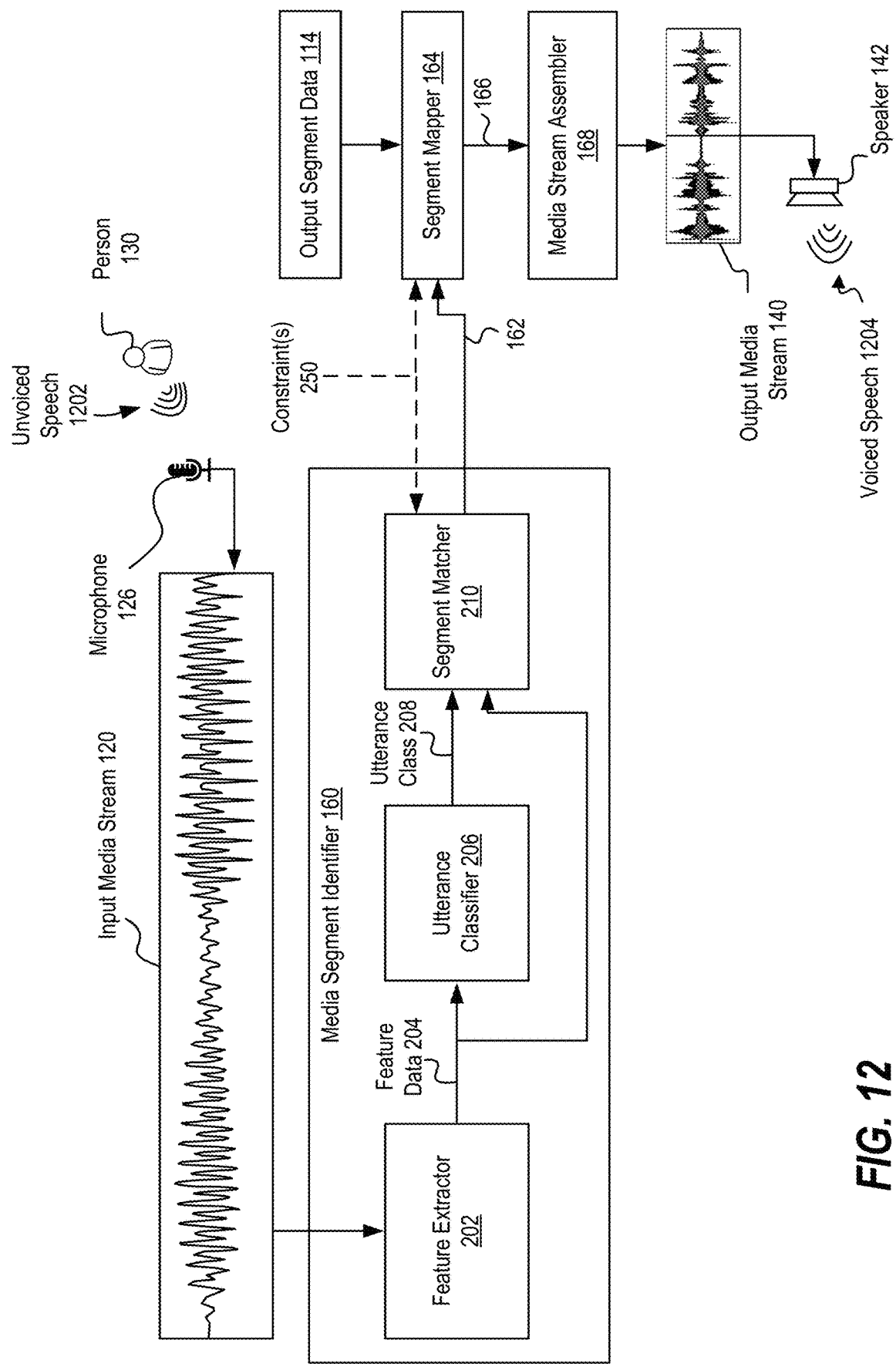
FIG. 12 is a diagram illustrating particular aspects of operations performed by the system of FIG. 1 to generate and use a media output segment identifier based on an input media stream, in accordance with some examples of the present disclosure.

FIG. 12 is a diagram illustrating particular aspects of operations performed by the system of FIG. 1 to generate and use a media output segment identifier based on an input media stream, in accordance with some examples of the present disclosure. In particular, FIG. 12 highlights a fourth example of voice modification using components of the system 100 in accordance with some implementations.

FIG. 12 illustrates examples of the media segment identifier 160, the segment mapper 164, and the media stream assembler 168, each of which may include the features and/or perform the operations described with respect to any of FIGS. 1-8. For example, in FIG. 12, the media segment identifier 160 includes the feature extractor 202, the utterance classifier 206, and the segment matcher 210. Additionally, the media segment identifier 160 generates data (e.g., the media output segment identifier 162) that is used by the segment mapper 164 and the media stream assembler 168 to generate the output media stream 140.

In the example illustrated in FIG. 12, the input media stream 120 is received via the microphone 126 and includes unvoiced speech 1202 (e.g., whispered speech of the person 130). In this example, the media segment identifier 160 parses the input media stream 120 into segments and provides the segments as input to the feature extractor 202. The input media stream 120 may be parsed based on time (e.g., such that each segment represents a portion of the input media stream having a specified duration) or based on content of the unvoiced speech 1202 (e.g., based on sounds present in the unvoiced speech 1202).

In the example illustrated in FIG. 12, the feature extractor 202 generates the feature data 204 based on one or more segments of the input media stream 120 and passes the feature data 204 to the utterance classifier 206 and to the segment matcher 210. The utterance classifier 206 determines an utterance class 208 associated with the feature data 204 and passes the utterance class 208 to the segment matcher 210. The segment matcher 210 generates the media output segment identifier 162 based on the utterance class 208 and the feature data 204. Optionally, the segment matcher 210 may determine the media output segment identifier 162 further based on the constraint(s) 250.

The segment mapper 164 retrieves or generates a media output segment 166 based on the media output segment identifier 162 (and optionally based on the constraint(s) 250). In the example illustrated in FIG. 12, the media output segment 166 corresponds to a segment of pre-recorded voiced speech including one or more sounds corresponding to sound(s) of the segment of the input media stream 120 represented by the media output segment identifier 162. The voiced speech may be pre-recorded by the person 130 or by another person. The media output segment 166 is provided to the media stream assembler 168, along with other media segments to generate the output media stream 140. In the example of FIG. 12, the output media stream 140 is played out by the speaker 142 as output representing voiced speech 1204 based on unvoiced speech 1202 in the input media stream 120. Although FIG. 12 is illustrated as generating voiced speech 1204 based on unvoiced speech 1202, in other implementations, unvoiced speech 1202 can be generated based on voiced speech 1204.

Figure 13:
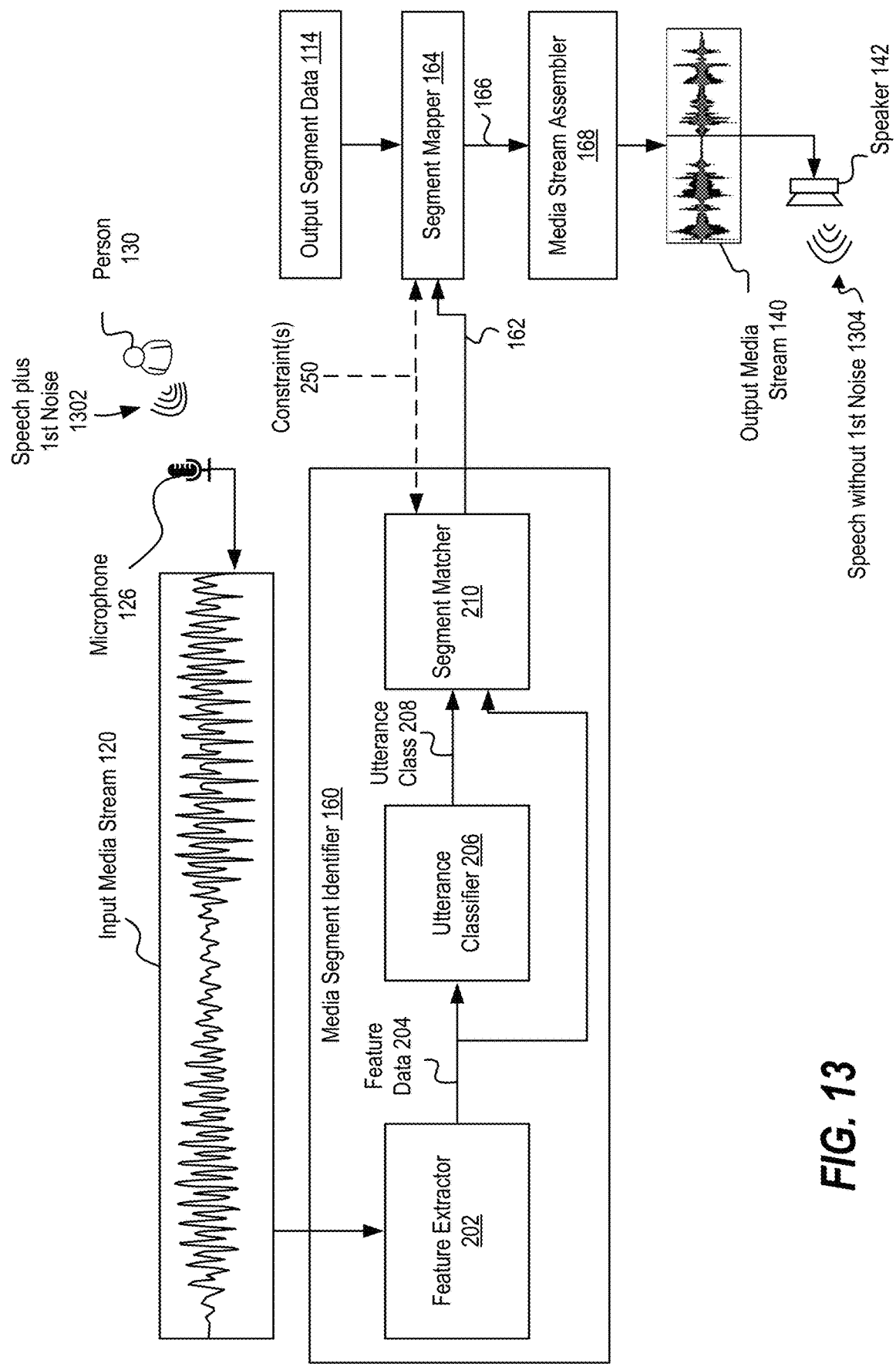
FIG. 13 is a diagram illustrating particular aspects of operations performed by the system of FIG. 1 to generate and use a media output segment identifier based on an input media stream, in accordance with some examples of the present disclosure.

FIG. 13 is a diagram illustrating particular aspects of operations performed by the system of FIG. 1 to generate and use a media output segment identifier based on an input media stream, in accordance with some examples of the present disclosure. In particular, FIG. 13 highlights an example of noise reduction using components of the system 100 in accordance with some implementations.

FIG. 13 illustrates examples of the media segment identifier 160, the segment mapper 164, and the media stream assembler 168, each of which may include the features and/or perform the operations described with respect to any of FIGS. 1-8. For example, in FIG. 13, the media segment identifier 160 includes the feature extractor 202, the utterance classifier 206, and the segment matcher 210. Additionally, the media segment identifier 160 generates data (e.g., the media output segment identifier 162) that is used by the segment mapper 164 and the media stream assembler 168 to generate the output media stream 140.

In the example illustrated in FIG. 13, the input media stream 120 is received via the microphone 126 and includes speech with first noise 1302. In this example, the media segment identifier 160 parses the input media stream 120 into segments and provides the segments as input to the feature extractor 202. The input media stream 120 may be parsed based on time (e.g., such that each segment represents a portion of the input media stream 120 having a specified duration) or based on content of the input media stream 120 (e.g., based on sounds present in the speech with the first noise 1302).

In the example illustrated in FIG. 13, the feature extractor 202 generates the feature data 204 based on one or more segments of the input media stream 120 and passes the feature data 204 to the utterance classifier 206 and to the segment matcher 210. The utterance classifier 206 determines an utterance class 208 associated with the feature data 204 and passes the utterance class 208 to the segment matcher 210. The segment matcher 210 generates the media output segment identifier 162 based on the utterance class 208 and the feature data 204. Optionally, the segment matcher 210 may determine the media output segment identifier 162 further based on the constraint(s) 250.

The segment mapper 164 retrieves or generates a media output segment 166 based on the media output segment identifier 162 (and optionally based on the constraint(s) 250). In the example illustrated in FIG. 13, the media output segment 166 corresponds to a segment of pre-recorded speech without the first noise and includes one or more sounds corresponding to sound(s) of the segment of the input media stream 120 represented by the media output segment identifier 162. The speech may be pre-recorded by the person 130 or by another person. The media output segment 166 is provided to the media stream assembler 168, along with other media segments to generate the output media stream 140. In the example of FIG. 13, the output media stream 140 is played out by the speaker 142 as output representing speech without the first noise 1304.

Figure 14:
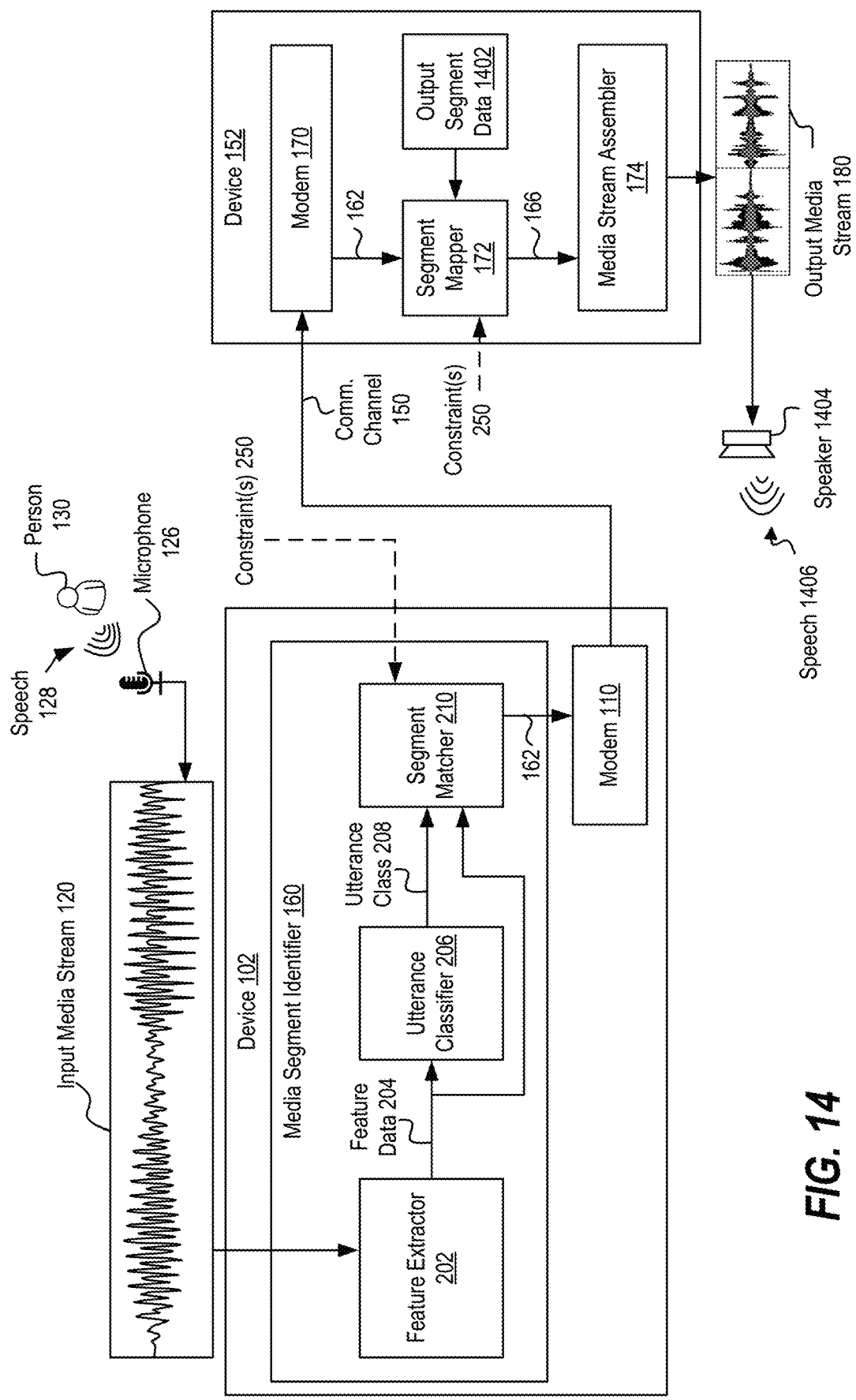
FIG. 14 is a diagram illustrating particular aspects of operations performed by the system of FIG. 1 to generate and use a media output segment identifier based on an input media stream, in accordance with some examples of the present disclosure.

FIG. 14 is a diagram illustrating particular aspects of operations performed by the system of FIG. 1 to generate and use a media output segment identifier based on an input media stream, in accordance with some examples of the present disclosure. In particular, FIG. 14 highlights a first example of communication between two devices using components of the system 100 in accordance with some implementations.

FIG. 14 illustrates examples of the media segment identifier 160, the segment mapper 172, and the media stream assembler 174, each of which may include the features and/or perform the operations described with respect to any of FIGS. 1-8. For example, in FIG. 14, the media segment identifier 160 includes the feature extractor 202, the utterance classifier 206, and the segment matcher 210. Additionally, the media segment identifier 160 generates data (e.g., the media output segment identifier 162) that is used by the segment mapper 172 and the media stream assembler 174 to generate the output media stream 180.

In the example illustrated in FIG. 14, the input media stream 120 is received via the microphone 126 and includes speech 128 of the person 130. In this example, the media segment identifier 160 parses the input media stream 120 into segments and provides the segments as input to the feature extractor 202. The input media stream 120 may be parsed based on time (e.g., such that each segment represents a portion of the input media stream having a specified duration) or based on content of the speech 128 (e.g., based on sounds present in the speech 128).

In the example illustrated in FIG. 14, the feature extractor 202 generates the feature data 204 based on one or more segments of the input media stream 120 and passes the feature data 204 to the utterance classifier 206 and to the segment matcher 210. The utterance classifier 206 determines an utterance class 208 associated with the feature data 204 and passes the utterance class 208 to the segment matcher 210. The segment matcher 210 generates the media output segment identifier 162 based on the utterance class 208 and the feature data 204. Optionally, the segment matcher 210 may determine the media output segment identifier 162 further based on the constraint(s) 250.

In the example illustrated in FIG. 14, the media output segment identifier 162 is provided to the modem 110, which transmits data representing the media output segment identifier 162 over the communication channel 150 to the device 152. Optionally, data representing the constraint(s) 250 may also be provided to the modem 110 for transmission. The media output segment identifier 162 can be viewed as a very compressed representation of particular features of the input media stream 120. For example, the input media stream 120 may include information representing every aspect of the speech 128, such as timing, pitch, volume, as well as other sounds detected by the microphone (e.g., noise or other speakers). In contrast, the media output segment identifier 162 represents specific features extracted from the input media stream, such as phonemes, biphones, or other utterance segments. Thus, the media output segment identifier 162 can be transmitted using significantly fewer communication resources (e.g., power, channel time, bits) than would be used to transmit information representing the entire waveform of the input media stream 120. To illustrate, in the experiment described above in which the media output segment identifier 162 included about 96,000 elements in a one-hot encoded vector, data representing real-time one-way voice communications could be transmitted using about 100 bits per second. As noted above, the media output segment identifier 162 used in this experiment was larger than needed; thus, even lower bit rates could be achieved by reducing the dimensionality of the media output segment identifier 162. For example, the media output segment identifier 162 could be reduced to include one element per phoneme or one element per biphone in the particular language being transmitted (e.g., by removing duplicates or near-duplicates as described above), which would further reduce the communication resources used to transmit the data representing the media output segment identifier 162.

In FIG. 14, the modem 170 receives information transmitted via the communication channel 150 and provides the media output segment identifier 162 to the segment mapper 172. The segment mapper 172 retrieves or generates a media output segment 166 based on the media output segment identifier 162 (and optionally, based on the constraint(s) 250). For example, the device 152 may include output segment data 1402. In this example, the output segment data 1402 is another instance of the output segment data 114 of any of FIGS. 1-6, or a similar set of data. In this example, the segment mapper 172 retrieves the media output segment 166 from the output segment data 1402 based on the media output segment identifier 162 (and optionally, based on the constraint(s) 250).

In the example illustrated in FIG. 14, the media output segment 166 corresponds to a segment of pre-recorded speech of the person 130 or of another person (e.g., a second person distinct from the person 130) making one or more sounds corresponding to sound(s) of the segment of the input media stream 120 represented by the media output segment identifier 162. The media output segment 166 is provided to the media stream assembler 174, along with other media segments to generate the output media stream 180. In the example of FIG. 14, the output media stream 180 is played out by a speaker 1404 as output speech 1406 representing the speech 128.

Figure 15:
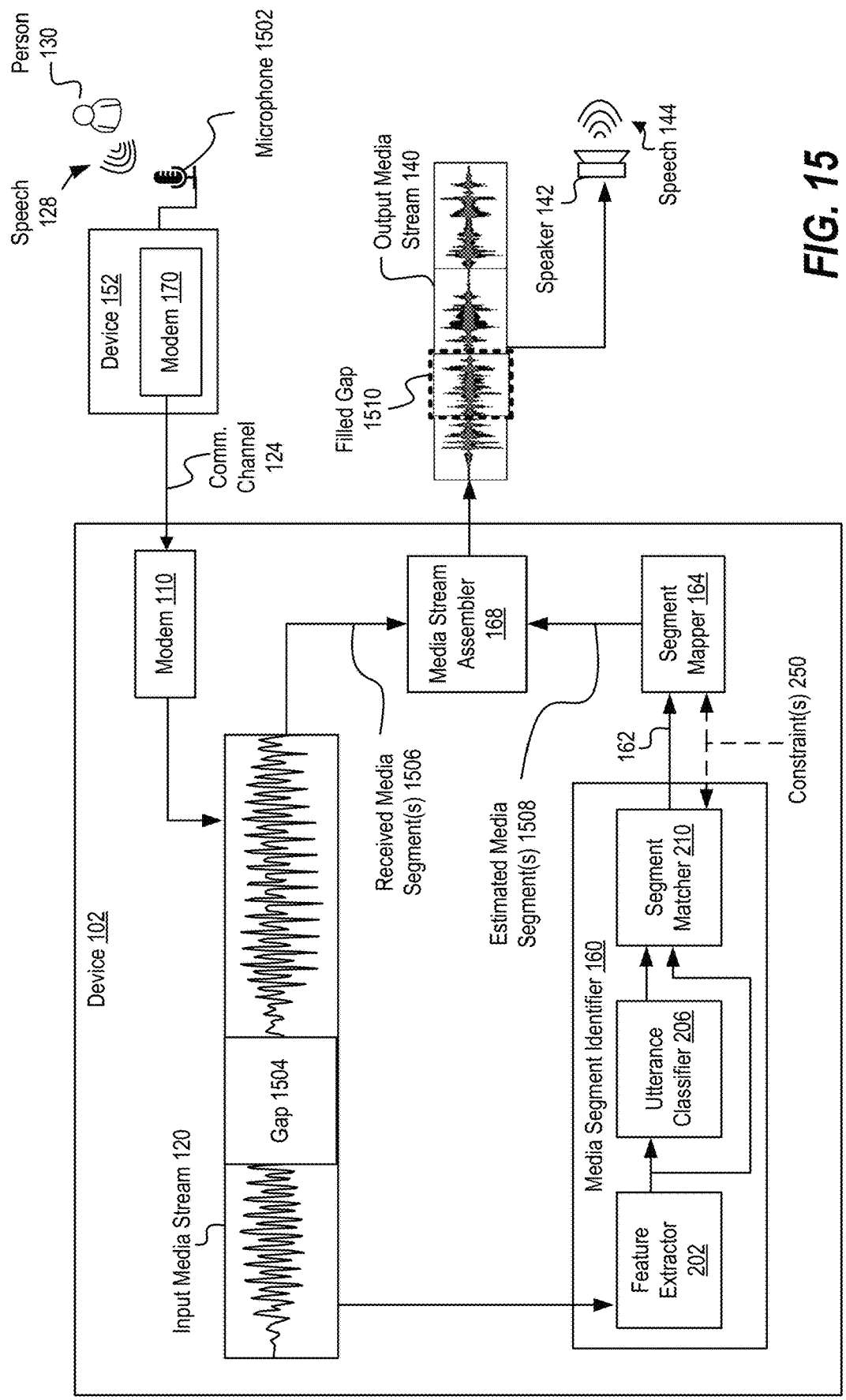
FIG. 15 is a diagram illustrating particular aspects of operations performed by the system of FIG. 1 to generate and use a media output segment identifier based on an input media stream, in accordance with some examples of the present disclosure.

FIG. 15 is a diagram illustrating particular aspects of operations performed by the system of FIG. 1 to generate and use a media output segment identifier based on an input media stream, in accordance with some examples of the present disclosure. In particular, FIG. 15 highlights a second example of communication between two devices using components of the system 100 in accordance with some implementations.

FIG. 15 illustrates examples of the media segment identifier 160, the segment mapper 164, and the media stream assembler 168, each of which may include the features and/or perform the operations described with respect to any of FIGS. 1-8. For example, in FIG. 15, the media segment identifier 160 includes the feature extractor 202, the utterance classifier 206, and the segment matcher 210. Additionally, the media segment identifier 160 generates data (e.g., the media output segment identifier 162) that is used by the segment mapper 164 and the media stream assembler 168 to generate the output media stream 140.

In the example illustrated in FIG. 15, the input media stream 120 is received via the communication channel 124. For example, a microphone 1502 of the device 152 receives audio data (e.g., an audio waveform) that includes speech 128 of the person 130 and may also include other sounds (e.g., background noise, etc.). The device 152 encodes the audio data (e.g., the entire audio waveform or one or more subbands of the waveform) using a speech or audio codec (such as a voice-over-internet protocol codec), and the modem 170 of the device 152 sends data packets including the encoded audio data to the device 102.

In the example illustrated in FIG. 15, the device 102 is configured to receive the audio data transmitted by the device 152 as the input media stream 120 and to generate the output media stream 140 based on the received audio data. For example, audio data received from the device 152 may be provided to the media stream assembler 168 as received media segments 1506.

In some circumstances, a portion of the input media stream 120 may be disrupted. For example, one or more data packets transmitted by the device 152 may be lost or corrupted, leaving a gap 1504 in the input media stream 120. In such circumstances, the media segment identifier 160 and the segment mapper 164 can be used together to generate estimated media segments 1508 to fill in for the missing audio data associated with the gap 1504.

For example, the input media stream 120 can be provided as input to the media segment identifier 160. The media segment identifier 160 parses the input media stream 120 into segments and provides the segments as input to the feature extractor 202. The input media stream 120 may be parsed based on time (e.g., such that each segment represents a portion of the input media stream having a specified duration) or based on content of the speech 128 (e.g., based on sounds present in the speech 128).

In the example illustrated in FIG. 15, the feature extractor 202 generates the feature data 204 based on one or more segments of the input media stream 120 and passes the feature data 204 to the utterance classifier 206 and to the segment matcher 210. The utterance classifier 206 determines an utterance class 208 associated with the feature data 204 and passes the utterance class 208 to the segment matcher 210. The segment matcher 210 generates the media output segment identifier 162 based on the utterance class 208 and the feature data 204. Optionally, the segment matcher 210 generates the media output segment identifier 162 further based on the constraint(s) 250 (e.g., based on a talker id. 912 of the person 130).

In the example illustrated in FIG. 15, one or more models of the media segment identifier 160 (e.g., the feature extractor 202, the utterance classifier 206, the segment matcher 210, or a combination thereof) is a temporally dynamic model that generates as output a prediction based on input that includes a temporal context. For example, although audio content associated with the gap 1504 is not available, the media segment identifier 160 can generate an estimate of the media output segment identifier 162 associated with audio of the gap 1504 because models of the media segment identifier 160 have been trained using normal speech. In some implementations, the estimates of the media output segment identifier 162 generated by the media segment identifier 160 can be improved by training one or more models of the media segment identifier 160 using training data that includes occasional gaps, similar to the gap 1504.

In the example illustrated in FIG. 15, the estimate of the media output segment identifier 162 (and optionally, the constraint(s) 250) is provided to the segment mapper 164 to generate or retrieve an estimated media segment 1508 corresponding to the gap 1504. In this example, the media stream assembler 168 generates the output media stream 140 using the received media segments 1506, and fills any gaps (e.g., the gap 1504) using estimated media segments 1508. The output media stream 140 with one or more filled gaps 1510 can be provided to the speaker 142 to generate output including a representation of the speech 144.

Thus, the system 100 can be used to improve audio quality of output of a receiving device in the event that one or more packets of audio data are not available for playback due to packet loss or packet corruption.

Figure 16:
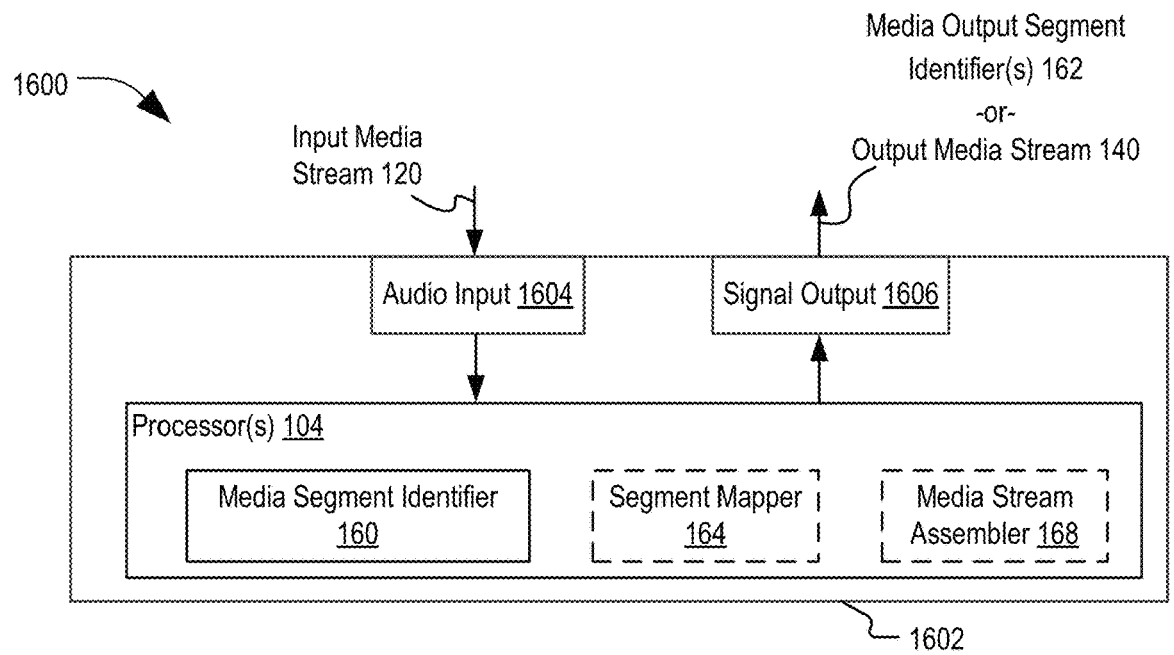
FIG. 16 illustrates an example of an integrated circuit operable to generate and/or use a media output segment identifier based on an input media stream, in accordance with some examples of the present disclosure.
Figure 20:
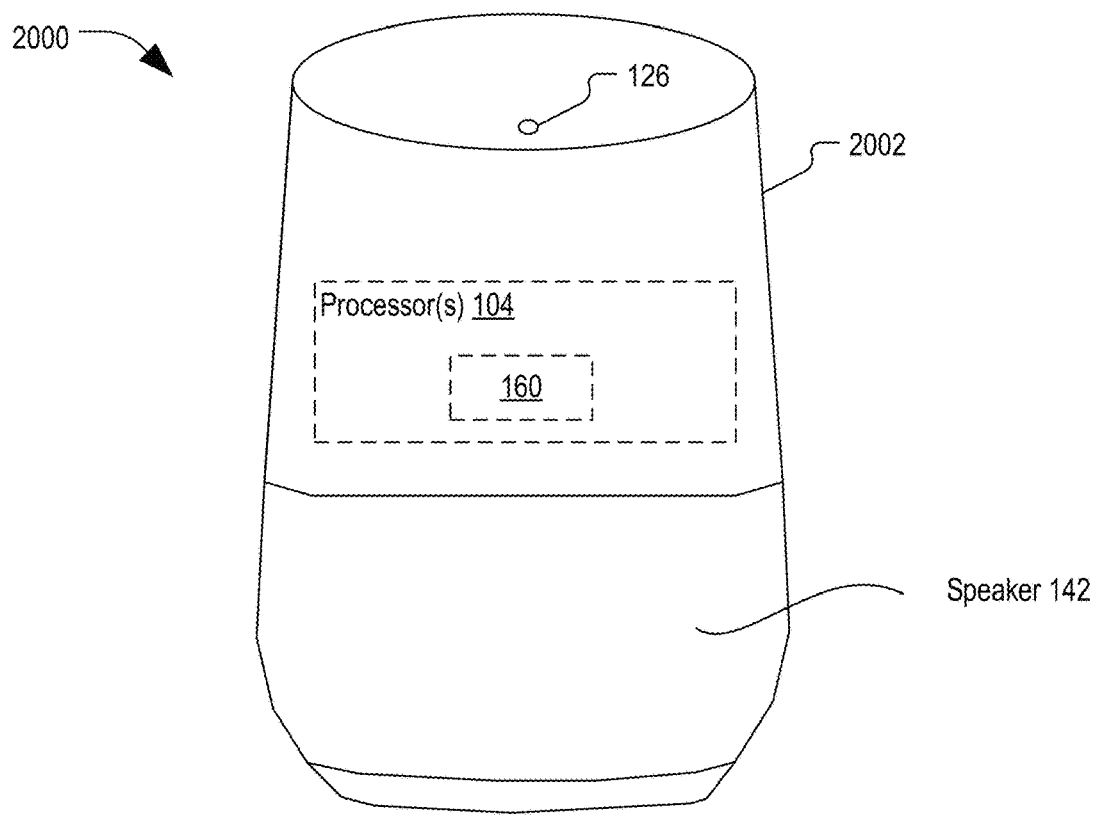
FIG. 20 is a diagram of a voice-controlled speaker system operable to generate and/or use a media output segment identifier based on an input media stream, in accordance with some examples of the present disclosure.
Figure 21:
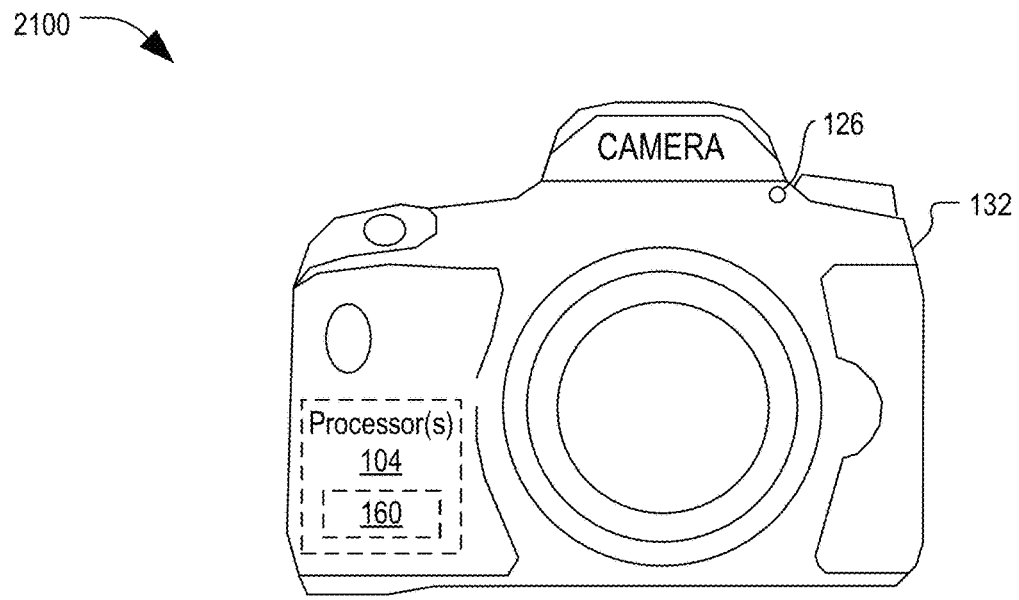
FIG. 21 is a diagram of a camera operable to generate and/or use a media output segment identifier based on an input media stream, in accordance with some examples of the present disclosure.

FIG. 16 depicts an implementation 1600 of the device 102 as an integrated circuit 1602 that includes the one or more processors 104. The integrated circuit 1602 also includes an audio input 1604, such as one or more bus interfaces, to enable the input media stream 120 to be received for processing. The integrated circuit 1602 also includes a signal output 1606, such as a bus interface, to enable sending of an output signal, such as the output media stream 140 or the media output segment identifier(s) 162. In the example illustrated in FIG. 16, the processor(s) 104 include the media segment identifier 160, and optionally, include the segment mapper 164 and the media stream assembler 168. The integrated circuit 1602 enables implementation of operations to generate and use a media output segment identifier as a component in a system that includes microphones, such as a mobile phone or tablet as depicted in FIG. 14, a headset as depicted in FIG. 15, a wearable electronic device as depicted in FIG. 16, a voice-controlled speaker system as depicted in FIG. 17, a camera as depicted in FIG. 18, a virtual reality, mixed reality, or augmented reality headset as depicted in FIG. 19, or a vehicle as depicted in FIG. 20 or FIG. 21.

Figure 17:
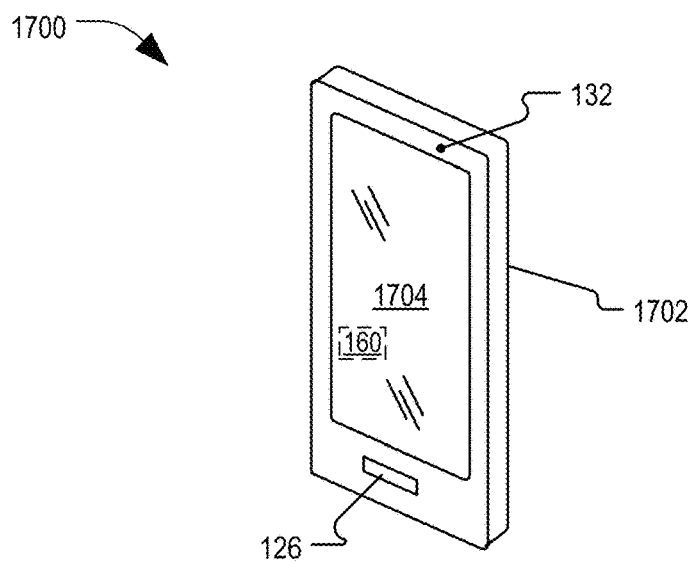
FIG. 17 is a diagram of a mobile device operable to generate and/or use a media output segment identifier based on an input media stream, in accordance with some examples of the present disclosure.

FIG. 17 depicts an implementation 1700 in which the device 102 includes a mobile device 1702, such as a phone or tablet, as illustrative, non-limiting examples. The mobile device 1702 includes the microphone 126, the camera 132, and a display screen 1704. Components of the processor(s) 104, including the media segment identifier 160 and optionally the segment mapper 164 and the media stream assembler 168, are integrated in the mobile device 1702 and are illustrated using dashed lines to indicate internal components that are not generally visible to a user of the mobile device 1702. In a particular example, the media segment identifier 160 operates to generate media output segment identifiers corresponding to segments of an input media stream. For example, the microphone 126 may capture speech of a user of the mobile device 1702, and the media segment identifier 160 may generate media output segment identifiers representing phonemes or other utterance segments of the speech. The media output segment identifiers may be used at the mobile device 1702 or transmitted to another mobile device to generate an output media stream. Additionally, or alternatively, in some examples, the mobile device 1702 may receive an input media stream from another device, and the media segment identifier 160 may operate to generate estimated media segments to fill gaps in the output media stream due to missing or corrupt packets of the input media stream.

Figure 18:
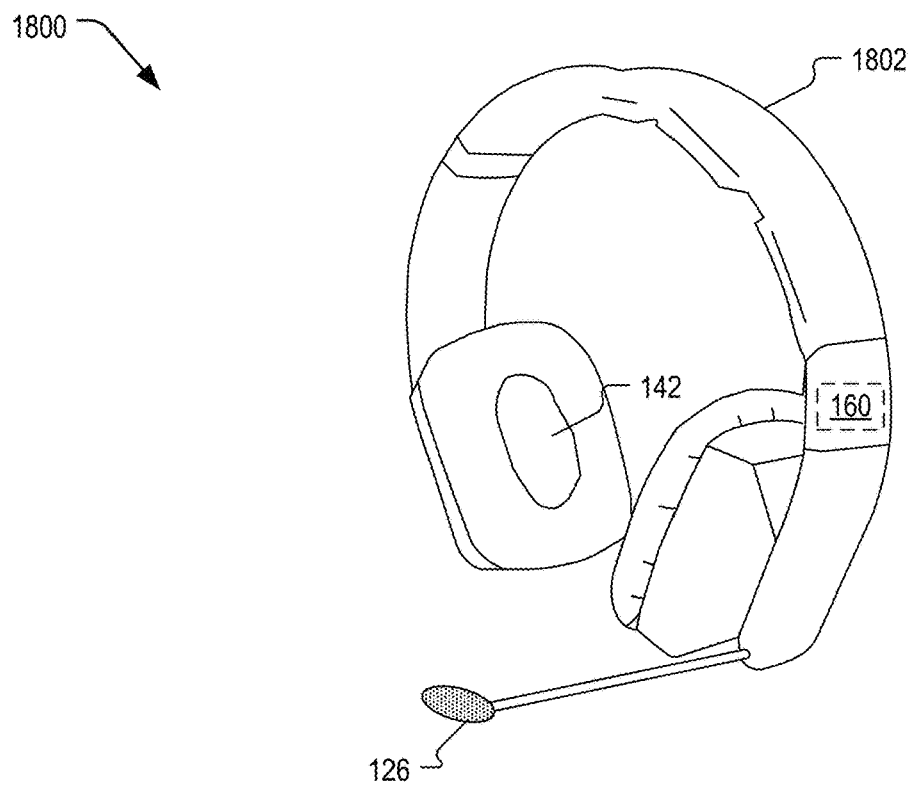
FIG. 18 is a diagram of a headset operable to generate and/or use a media output segment identifier based on an input media stream, in accordance with some examples of the present disclosure.

FIG. 18 depicts an implementation 1800 in which the device 102 includes a headset device 1802. The headset device 1802 includes the microphone 126. Components of the processor(s) 104, including the media segment identifier 160 and optionally the segment mapper 164 and the media stream assembler 168, are integrated in the headset device 1802. In a particular example, the media segment identifier 160 operates to generate media output segment identifiers corresponding to segments of an input media stream. For example, the microphone 126 may capture speech of a user of the headset device 1802 and may generate media output segment identifiers representing phonemes or other utterance segments of the speech. The media output segment identifiers may be used to generate an output media stream from one or more speakers 142 of the headset device 1802, or the media output segment identifiers may be transmitted to another device (e.g., a mobile device, a game console, a voice assistant, etc.) to generate the output media stream. Additionally, or alternatively, in some examples, the headset device 1802 may receive an input media stream from another device, and the media segment identifier 160 may operate to generate estimated media segments to fill gaps in the output media stream due to missing or corrupt packets of the input media stream.

Figure 19:
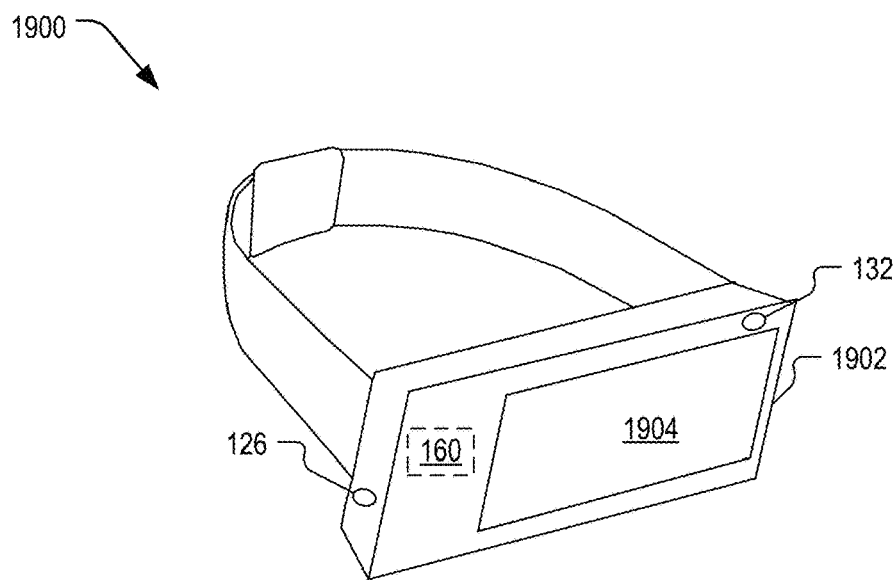
FIG. 19 is a diagram of a wearable electronic device operable to generate and/or use a media output segment identifier based on an input media stream, in accordance with some examples of the present disclosure.

FIG. 19 depicts an implementation 1900 in which the device 102 includes a wearable electronic device 1902, illustrated as a "smart watch." The wearable electronic device 1902 includes the processor(s) 104 and a display screen 1904. Components of the processor(s) 104, including the media segment identifier 160 and optionally the segment mapper 164 and the media stream assembler 168, are integrated in the wearable electronic device 1902. In a particular example, the media segment identifier 160 operates to generate media output segment identifiers corresponding to segments of an input media stream. For example, the microphone 126 may capture speech of a user of the wearable electronic device 1902 and may generate media output segment identifiers representing phonemes or other utterance segments of the speech. The media output segment identifiers may be used to generate an output media stream at the display screen 1904 of the wearable electronic device 1902, or the media output segment identifiers may be transmitted to another device (e.g., a mobile device, a game console, a voice assistant, etc.) to generate the output media stream. Additionally, or alternatively, in some examples, the wearable electronic device 1902 may receive an input media stream from another device, and the media segment identifier 160 may operate to generate estimated media segments to fill gaps in the output media stream due to missing or corrupt packets of the input media stream.

FIG. 20 is an implementation 2000 in which the device 102 includes a wireless speaker and voice activated device 2002. The wireless speaker and voice activated device 2002 can have wireless network connectivity and is configured to execute an assistant operation. The wireless speaker and voice activated device 2002 of FIG. 20 includes the processor(s) 104, which include the media segment identifier 160 (and optionally the segment mapper 164 and the media stream assembler 168). Additionally, the wireless speaker and voice activated device 2002 includes the microphone 126 and the speaker 142. During operation, in response to receiving an input media stream including user speech, the media segment identifier 160 operates to generate media output segment identifiers corresponding to segments of an input media stream. For example, the microphone 126 may capture speech of a user of the wireless speaker and voice activated device 2002 and may generate media output segment identifiers representing phonemes or other utterance segments of the speech. The media output segment identifiers may be transmitted to another device (e.g., a mobile device, a game console, a voice assistant, etc.) to generate the output media stream. In some examples, the wireless speaker and voice activated device 2002 may receive an input media stream from another device and the media segment identifier 160 may operate to generate estimated media segments to fill gaps in the output media stream due to missing or corrupt packets of the input media stream.

FIG. 21 depicts an implementation 2100 in which the device 102 is integrated into or includes a portable electronic device that corresponds to the camera 132. In FIG. 21, the camera 132 includes the processor(s) 104 and the microphone 126. The processor(s) include the media segment identifier 160 and optionally also include the segment mapper 164 and the media stream assembler 168. During operation, the camera 132, the microphone 126, or both, generate an input media stream and the media segment identifier 160 segments the input media stream to generate media output segment identifiers corresponding to segments of an input media stream. For example, the microphone 126 may capture speech of a user of the camera 132 and may generate media output segment identifiers representing phonemes or other utterance segments of the speech. The media output segment identifiers may be transmitted to another device (e.g., a mobile device, a game console, a voice assistant, etc.) to generate the output media stream.

Figure 22:
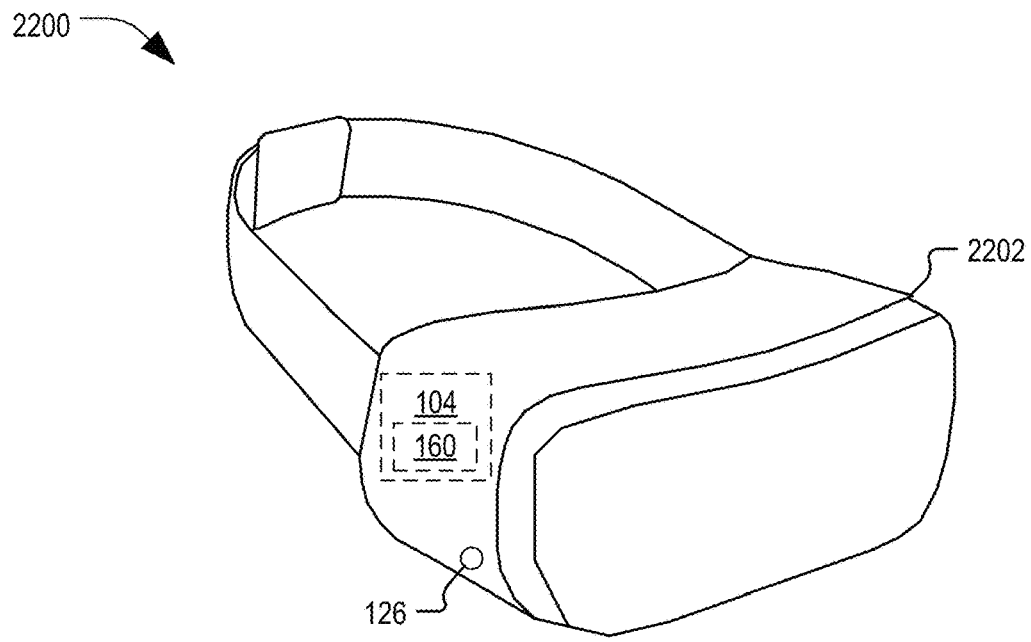
FIG. 22 is a diagram of a headset, such as a virtual reality, mixed reality, or augmented reality headset, operable to generate and/or use a media output segment identifier based on an input media stream, in accordance with some examples of the present disclosure.

FIG. 22 depicts an implementation 2200 in which the device 102 includes a portable electronic device that corresponds to an extended reality headset 2202 (e.g., a virtual reality headset, a mixed reality headset, an augmented reality headset, or a combination thereof). The extended reality headset 2202 includes the microphone 126 and the processor(s) 104. In a particular aspect, a visual interface device is positioned in front of the user's eyes to enable display of augmented reality, mixed reality, or virtual reality images or scenes to the user while the extended reality headset 2202 is worn. In a particular example, the visual interface device is configured to display a notification indicating user speech detected in the audio signal from the microphone 126. In a particular implementation, the processor(s) 104 include the media segment identifier 160 and optionally also include the segment mapper 164 and the media stream assembler 168. During operation, the microphone 126 may generate an input media stream, and the media segment identifier 160 segments the input media stream to generate media output segment identifiers corresponding to segments of an input media stream. For example, the microphone 126 may capture speech of a user of the extended reality headset 2202, and the media segment identifier 160 may generate media output segment identifiers representing phonemes or other utterance segments of the speech. The media output segment identifiers may be transmitted to another device (e.g., a mobile device, a game console, a voice assistant, etc.) to generate the output media stream.

Figure 23:
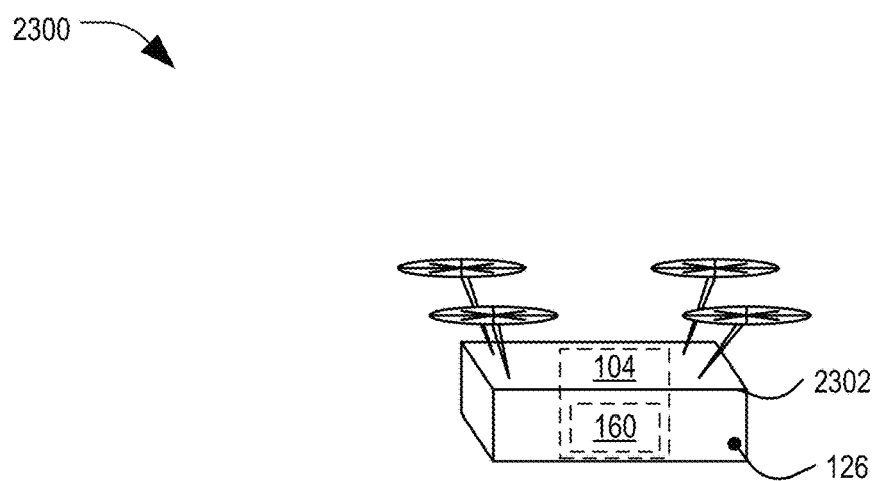
FIG. 23 is a diagram of a first example of a vehicle operable to generate and/or use a media output segment identifier based on an input media stream, in accordance with some examples of the present disclosure.

FIG. 23 depicts an implementation 2300 in which the device 102 corresponds to, or is integrated within, a vehicle 2302, illustrated as a manned or unmanned aerial device (e.g., a package delivery drone). The microphone 126 and the processor(s) 104 are integrated into the vehicle 2302. In a particular implementation, the processor(s) 104 include the media segment identifier 160 and optionally also include the segment mapper 164 and the media stream assembler 168. During operation, the microphone 126 may generate an input media stream, and the media segment identifier 160 segments the input media stream to generate media output segment identifiers corresponding to segments of an input media stream. For example, the microphone 126 may capture speech of a person near the vehicle 2302 (such as speech including delivery instructions from an authorized user of the vehicle 2302) and the media segment identifier 160 may generate media output segment identifiers representing phonemes or other utterance segments of the speech. The media output segment identifiers may be transmitted to another device (e.g., a server device, etc.) to generate the output media stream or to store the media output segment identifiers (e.g., as evidence of the delivery instructions).

Figure 24:
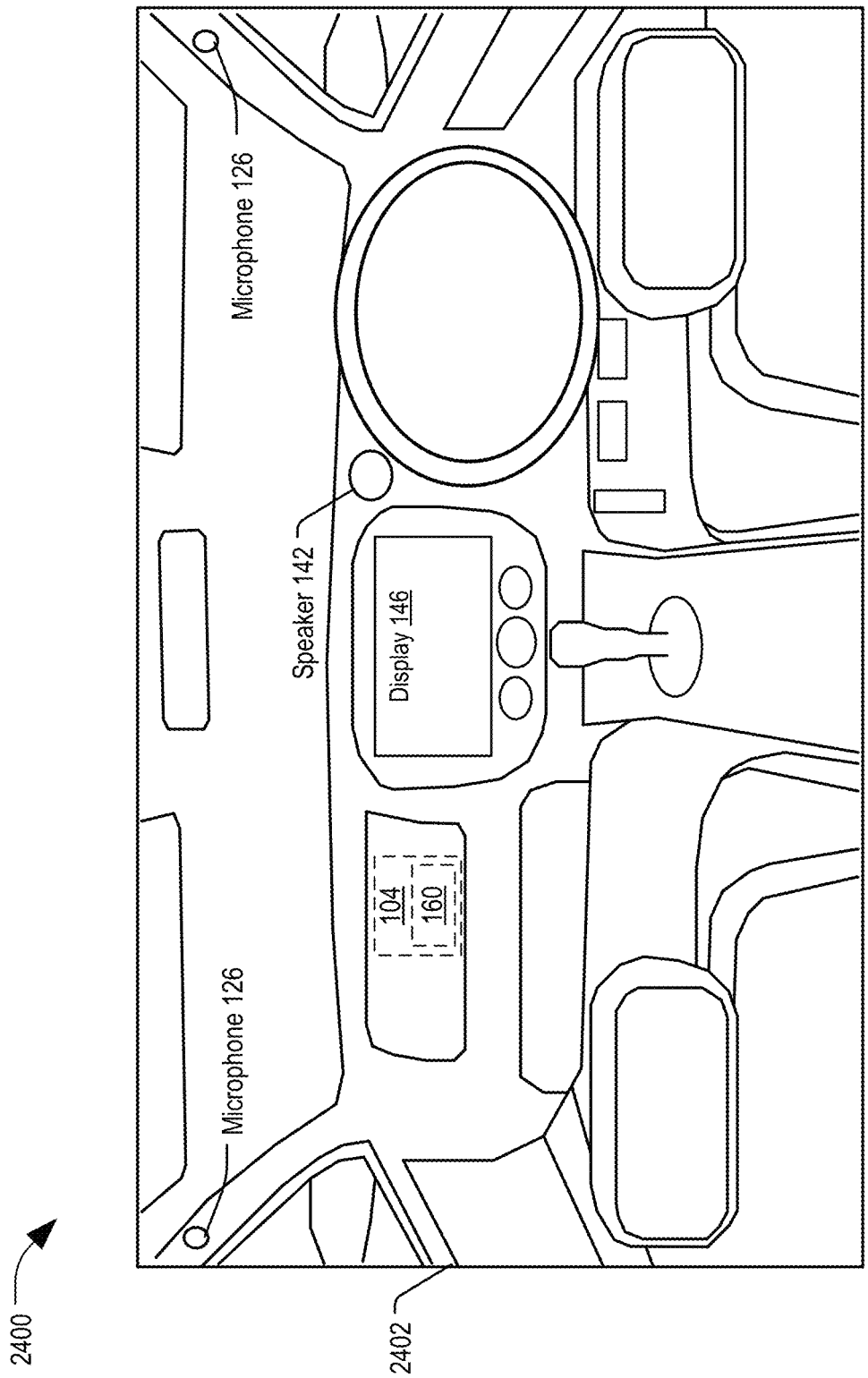
FIG. 24 is a diagram of a second example of a vehicle operable to generate and/or use a media output segment identifier based on an input media stream, in accordance with some examples of the present disclosure.

FIG. 24 depicts another implementation 2400 in which the device 102 corresponds to, or is integrated within, a vehicle 2402, illustrated as a car. The vehicle 2402 includes the processor(s) 104, which include the media segment identifier 160 and optionally include the segment mapper 164 and the media stream assembler 168. The vehicle 2402 also includes the microphone 126, the speaker 142, and the display device 146. The microphone 126 is positioned to capture utterances of an operator of the vehicle 2402 or a passenger of the vehicle 2402. During operation, the microphone 126 may generate an input media stream, and the media segment identifier 160 segments the input media stream to generate media output segment identifiers corresponding to segments of an input media stream. For example, the microphone 126 may capture speech of the operator of the vehicle 2402 and the media segment identifier 160 may generate media output segment identifiers representing phonemes or other utterance segments of the speech. The media output segment identifiers may be transmitted to another device (e.g., another vehicle, a mobile phone, etc.) to generate the output media stream. Additionally, or alternatively, in some examples, the vehicle 2402 may receive an input media stream from another device, and the media segment identifier 160 may operate to generate estimated media segments to fill gaps in the output media stream due to missing or corrupt packets of the input media stream.

Figure 25:
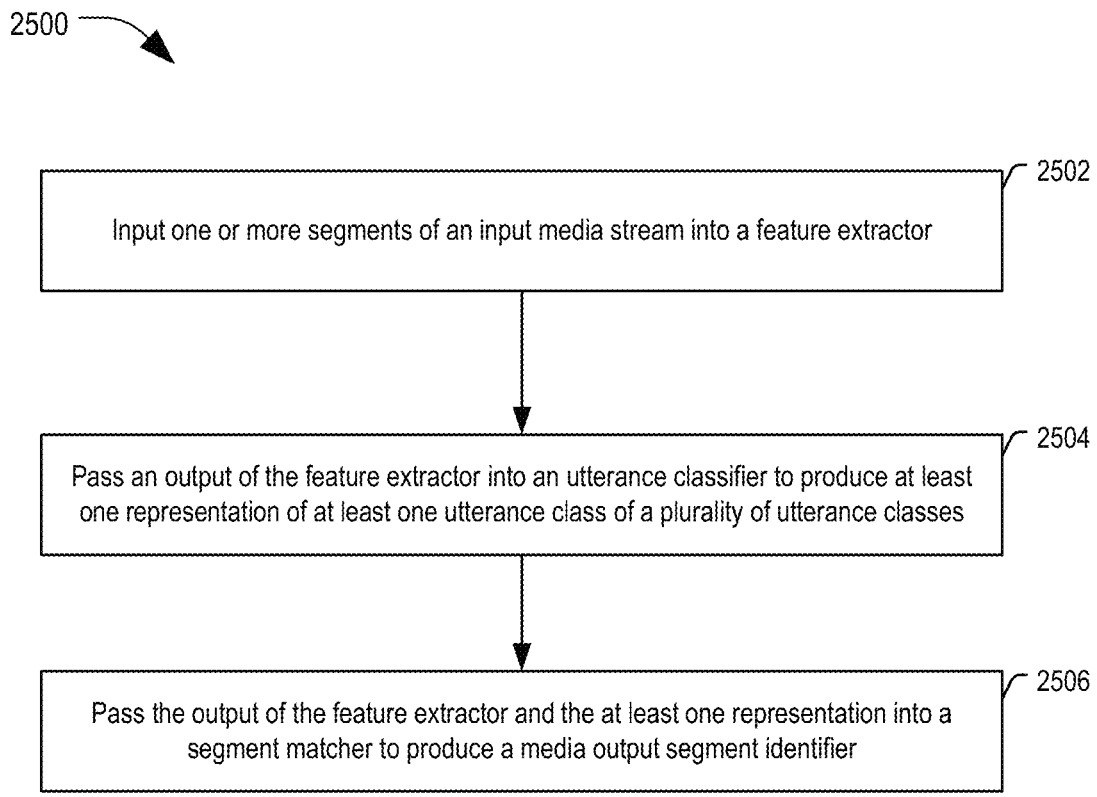
FIG. 25 is a diagram of a particular implementation of a method of generating a media output segment identifier based on an input media stream that may be performed by the device of FIG. 1, in accordance with some examples of the present disclosure.

Referring to FIG. 25, a particular implementation of a method 2500 of generating a media output segment identifier based on an input media stream is shown. In a particular aspect, one or more operations of the method 2500 are performed by at least one of the media segment identifier 160, the processor(s) 104, the device 102, the system 100 of FIG. 1, or a combination thereof.

The method 2500 includes, at block 2502, inputting one or more segments of an input media stream into a feature extractor. For example, the media segment identifier 160 parses the input media stream into media segments that are provided as input to the feature extractor 202 of FIG. 2. To illustrate, the input media stream may be parsed to generate segments that include one or more phonemes or one or more other utterance segments. The input media stream may be received via a microphone, via a camera, or via a communication channel. In a particular aspect, the input media stream includes audio representing speech of at least one person.

The method 2500 includes, at block 2504, passing an output of the feature extractor into an utterance classifier to produce at least one representation of at least one utterance class of a plurality of utterance classes. For example, the feature extractor 202 of FIG. 2 outputs feature data 204 that is provided as input to the utterance classifier 206. In this example, the utterance classifier 206 generates, as output, data indicating an utterance class 208 associated with the feature data 204.

The method 2500 includes, at block 2506, passing the output of the feature extractor and the at least one representation into a segment matcher to produce a media output segment identifier. For example, the utterance class 208 and the feature data 204 of FIG. 2 are provided as input to the segment matcher 210. In this example, the segment matcher 210 generates the media output segment identifier 162 as output.

In some implementations, the method 2500 also includes retrieving or generating one or more media output segments based on the media output segment identifier. In some such implementations, the media output segment identifier 162 may be passed into one or more memory units of a segment mapper. In such implementations, each of the memory units of the segment mapper includes a set of weights representing a respective media segment. For example, the segment mapper 164 of FIG. 5 includes an output layer 506 coupled to an embedding layer 504 via a plurality of links. In this example, each node of the embedding layer 504 may be envisioned as a memory unit that includes a respective set of the weights 508 that are used by the output layer 506 to generate media segment data 510 representing a particular media output segment 166.

In some implementations, a media segment (e.g., a media output segment) corresponding to the media output segment identifier may be retrieved from a database. For example, the segment mapper 164 of FIG. 4 accesses the media segment database 402 to retrieve the media output segment 166.

In some implementations, the method 2500 includes transmitting data indicating the media output segment identifier to another device. For example, the modem 110 of the device 102 of FIG. 1 and FIG. 11 may transmit the data indicating the media output segment identifier 162 to the device 152 to enable the device 152 to generate the output media stream 180.

The method 2500 of FIG. 25 may be implemented by a field-programmable gate array (FPGA) device, an application-specific integrated circuit (ASIC), a processing unit such as a central processing unit (CPU), a DSP, a controller, another hardware device, firmware device, or any combination thereof. As an example, the method 2500 of FIG. 25 may be performed by a processor that executes instructions, such as described with reference to FIG. 26.

Figure 26:
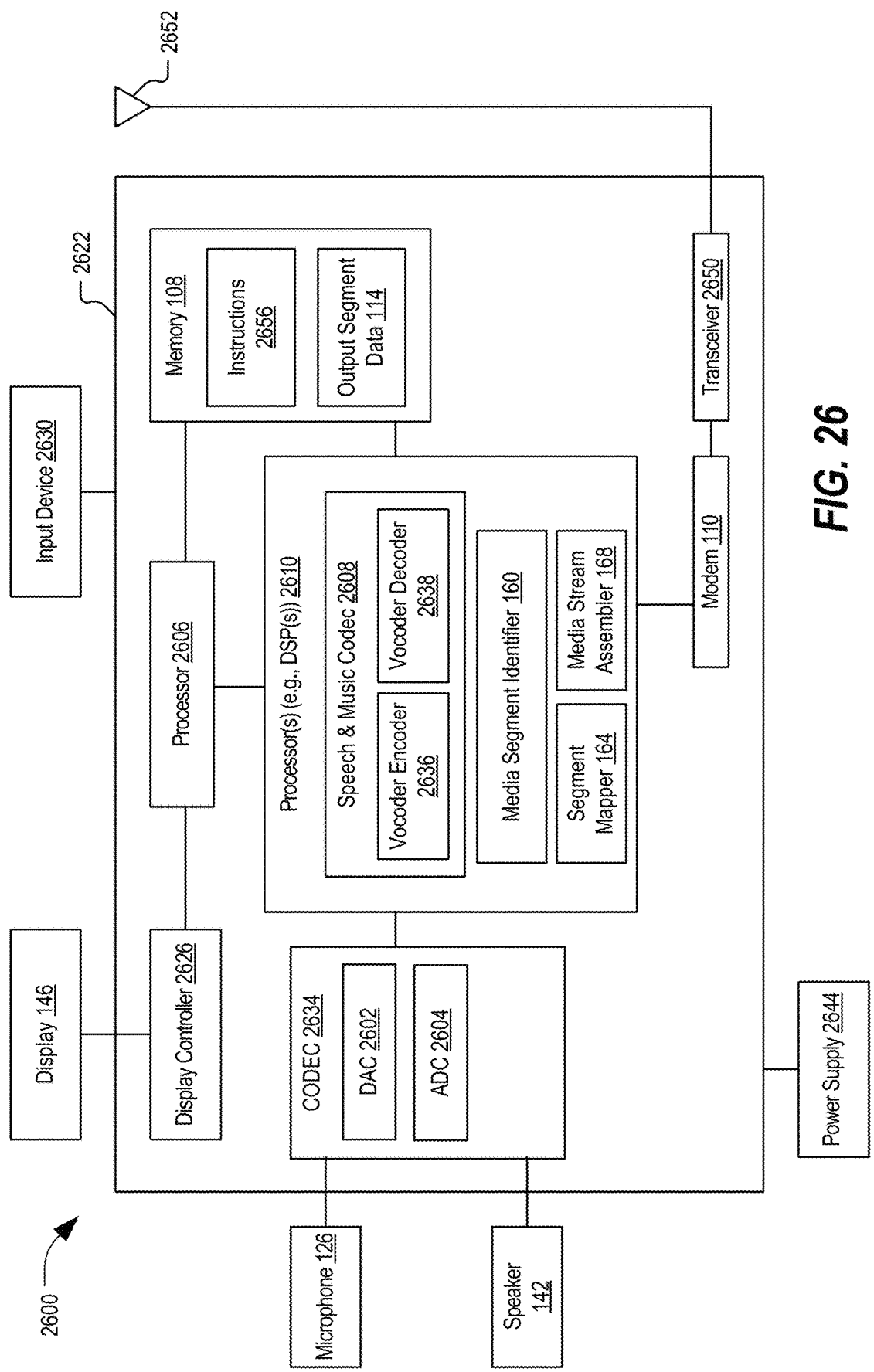
FIG. 26 is a block diagram of a particular illustrative example of a device that is operable to generate and/or use a media output segment identifier based on an input media stream, in accordance with some examples of the present disclosure.

Referring to FIG. 26, a block diagram of a particular illustrative implementation of a device is depicted and generally designated 2600. In various implementations, the device 2600 may have more or fewer components than illustrated in FIG. 26. In an illustrative implementation, the device 2600 may correspond to the device 102 or the device 152. In an illustrative implementation, the device 2600 may perform one or more operations described with reference to FIGS. 1-25.

In a particular implementation, the device 2600 includes a processor 2606 (e.g., a central processing unit (CPU)). The device 2600 may include one or more additional processors 2610 (e.g., one or more DSPs). In a particular aspect, the processor(s) 104 of FIG. 1 correspond to the processor 2606, the processors 2610, or a combination thereof. The processors 2610 may include a speech and music coder-decoder (CODEC) 2608 that includes a voice coder ("vocoder") encoder 2636, a vocoder decoder 2638, the media segment identifier 160, the segment mapper 164, the media stream assembler 168, or a combination thereof.

The device 2600 may include the memory 108 and a CODEC 2634. The memory 108 may include instructions 2656 that are executable by the one or more additional processors 2610 (or the processor 2606) to implement the functionality described with reference to the media segment identifier 160, the segment mapper 164, the media stream assembler 168, or a combination thereof. In the example illustrated in FIG. 26, the memory 108 also includes the output segment data 114.

In FIG. 26, the device 2600 includes the modem 110 coupled, via a transceiver 2650, to an antenna 2652. The modem 110, the transceiver 2650, and the antenna 2652 may be operable to receive an input media stream, to transmit an output media stream, to receive one or more media output segment identifiers, to transmit one or more media output segment identifiers, or a combination thereof.

The device 2600 may include the display device 146 coupled to a display controller 2626. The speaker 142 and the microphone 126 may be coupled to the CODEC 2634. The CODEC 2634 may include a digital-to-analog converter (DAC) 2602, an analog-to-digital converter (ADC) 2604, or both. In a particular implementation, the CODEC 2634 may receive analog signals from the microphone 126, convert the analog signals to digital signals using the analog-to-digital converter 2604, and provide the digital signals to the speech and music codec 2608. The speech and music codec 2608 may process the digital signals, and the digital signals may further be processed by the media segment identifier 160. In a particular implementation, the speech and music codec 2608 may provide digital signals to the CODEC 2634. The CODEC 2634 may convert the digital signals to analog signals using the digital-to-analog converter 2602 and may provide the analog signals to the speaker 142.

In a particular implementation, the device 2600 may be included in a system-in-package or system-on-chip device 2622. In a particular implementation, the memory 108, the processor 2606, the processors 2610, the display controller 2626, the CODEC 2634, and the modem 110 are included in the system-in-package or system-on-chip device 2622. In a particular implementation, an input device 2630 and a power supply 2644 are coupled to the system-in-package or the system-on-chip device 2622. Moreover, in a particular implementation, as illustrated in FIG. 26, the display device 146, the input device 2630, the speaker 142, the microphone 126, the antenna 2652, and the power supply 2644 are external to the system-in-package or the system-on-chip device 2622. In a particular implementation, each of the display device 146, the input device 2630, the speaker 142, the microphone 126, the antenna 2652, and the power supply 2644 may be coupled to a component of the system-in-package or the system-on-chip device 2622, such as an interface (e.g., the input interface 106 or the output interface 112) or a controller.

The device 2600 may include a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a mixed reality headset, a virtual reality headset, an aerial vehicle, a home automation system, a voice-activated device, a wireless speaker and voice activated device, a portable electronic device, a car, a computing device, a communication device, an internet-of-things (IoT) device, a virtual reality (VR) device, a base station, a mobile device, or any combination thereof.

In conjunction with the described implementations, an apparatus includes means for inputting one or more segments of an input media stream into a feature extractor. For example, the means for inputting the one or more segments of the input media stream into the feature extractor can correspond to the microphone 126, the camera 132, the communication channel 124, the input interface 106, the processor(s) 104, the media segment identifier 160, the processor 2606, the processor(s) 2610, the codec 2634, one or more other circuits or components configured to input one or more segments of an input media stream into a feature extractor, or any combination thereof.

In conjunction with the described implementations, the apparatus also includes means for passing an output of the feature extractor into an utterance classifier to produce at least one representation of at least one utterance class of a plurality of utterance classes. For example, the means for passing the output of the feature extractor into the utterance classifier can correspond to the feature extractor 202, the processor(s) 104, the media segment identifier 160, the processor 2606, the processor(s) 2610, one or more other circuits or components configured to provide input to an utterance classifier, or any combination thereof.

In conjunction with the described implementations, the apparatus also includes means for passing the output of the feature extractor and the at least one representation of at least one utterance class into a segment matcher to produce a media output segment identifier. For example, the means for passing the output of the feature extractor and the at least one representation of at least one utterance class into the segment matcher can correspond to the feature extractor 202, the utterance classifier 206, the processor(s) 104, the media segment identifier 160, the processor 2606, the processor(s) 2610, one or more other circuits or components configured to provide input to a segment matcher, or any combination thereof.

In some implementations, a non-transitory computer-readable medium (e.g., a computer-readable storage device, such as the memory 108) includes instructions (e.g., the instructions 2656) that, when executed by one or more processors (e.g., the one or more processors 104, the one or more processors 2610 or the processor 2606), cause the one or more processors to input one or more segments of an input media stream into a feature extractor; pass an output of the feature extractor into an utterance classifier to produce at least one representation of at least one utterance class of a plurality of utterance classes; and pass the output of the feature extractor and the at least one representation into a segment matcher to produce a media output segment identifier.

Particular aspects of the disclosure are described below in sets of interrelated Examples:

According to Example 1, a device includes: one or more processors configured to: input one or more segments of an input media stream into a feature extractor; pass an output of the feature extractor into an utterance classifier to produce at least one representation of at least one utterance class of a plurality of utterance classes; and pass the output of the feature extractor and the at least one representation into a segment matcher to produce a media output segment identifier.

Example 2 includes the device of Example 1, wherein the media output segment identifier includes a unit index.

Example 3 includes the device of Example 1 or Example 2, wherein the segment matcher is configured to obtain, based on the at least one representation, data representing one or more candidate frames of a media output segment and perform a comparison of the data representing the one or more candidate frames to the output of the feature extractor, and wherein the media output segment identifier is determined based on a result of the comparison.

Example 4 includes the device of any of Examples 1-3, wherein the segment matcher is configured to: obtain data representing a plurality of candidate frames, each candidate frame of the plurality of candidate frames corresponding to a portion of a respective media output segment; and determine frame match scores for the plurality of candidate frames, wherein a frame match score of a particular candidate frame indicates an estimate of similarity of the particular candidate frame to an input frame represented by the output of the feature extractor, wherein the media output segment identifier is determined based, at least partially, on the frame match score.

Example 5 includes the device of Example 4, wherein the segment matcher is configured to determine the frame match score for the particular candidate frame by passing the output of the feature extractor and data representing the particular candidate frame into a trained machine-learning model to cause the trained machine-learning model to output the frame match score for the particular candidate frame.

Example 6 includes the device of Example 4, wherein the output of the feature extractor includes one or more speech parameter values for the input frame, and wherein the segment matcher is configured to determine the frame match score for the particular candidate frame based on comparison of speech parameter values of the one or more speech parameter values for the input frame and one or more corresponding speech parameter values for the particular candidate frame.

Example 8 includes the device of Example 4, wherein the segment matcher is configured to: determine, based on the one or more frame match scores, one or more candidate segments; and for each of the one or more candidate segments, determine a segment match score, wherein the segment match score of a particular candidate segment indicates an estimate of similarity of the particular candidate segment to an input segment represented by the output of the feature extractor, wherein the media output segment identifier is determined based, at least partially, on the one or more segment match scores.

Example 9 includes the device of Example 8, wherein the media output segment identifier identifies a media output segment associated with a largest segment match score among the one or more candidate segments.

Example 10 includes the device of Example 8, wherein the segment matcher is configured to determine the segment match score of the particular candidate segment based on dynamic time warping of data representing the particular candidate segment and data representing the input segment.

Example 11 includes the device of Example 8, wherein the segment matcher is configured to, for each input frame of an input segment, determine multiple frame match scores with respect to the input frame, wherein the input segment includes multiple input frames, wherein the segment match score of the particular candidate segment is based on frame match scores for candidate frames as compared to different ones of the multiple input frames and is further based on memory locations associated with the candidate frames.

Example 12 includes the device of Example 8, wherein the segment match score of the particular candidate segment is further based on the at least one representation of at least one utterance class.

Example 13 includes the device of any of Examples 1-12, wherein the segment matcher is configured to: obtain data representing one or more candidate frames of a media output segment; perform a comparison of the data representing the one or more candidate frames to the output of the feature extractor to identify one or more candidate segments; and determine, based on the at least one representation, a best match media output segment of the one or more candidate segments, and wherein the media output segment identifier identifies the best match media output segment.

Example 14 includes the device of any of Examples 1-13, wherein the one or more processors are further configured to pass one or more constraints to the segment matcher to determine the media output segment identifier.

Example 15 include the device of Example 14, wherein the one or more constraints include a talker identifier.

Example 16 includes the device of any of Examples 1-15, wherein the media output segment identifier identifies a recorded media segment corresponding to at least one phoneme.

Example 17 includes the device of any of Examples 1 to 16, wherein the one or more processors are further configured to pass the media output segment identifier into one or more memory units, wherein the each of the one or more memory units include a set of weights representing a respective media segment.

Example 18 includes the device of Example 16, wherein the one or more memory units produce a speech representation based on the media output segment identifier.

Example 19 includes the device of any of Examples 1 to 18, further including a modem coupled to the one or more processors, the modem configured to transmit data indicating the media output segment identifier to another device.

Example 20 includes the device of Example 19, wherein the input media stream includes audio representing speech, and transmission of the data indicating the media output segment identifier enables real-time generation of speech output at the other device.

Example 21 includes the device of any of Examples 1 to 16, wherein the one or more processors are further configured to retrieve, from a database, a media segment corresponding to the media output segment identifier.

Example 22 includes the device of any of Examples 1 to 21, further including one or more receivers configured to receive the input media stream over a communication channel.

Example 23 includes the device of any of Examples 1 to 22, wherein the one or more processors are further configured to determine that a particular media segment of the input media stream is not available for playout, and wherein the media output segment identifier corresponds to an estimate of the particular media segment.

Example 24 includes the device of Example 23, wherein the one or more processors are further configured to concatenate the estimate of the particular media segment with one or more media segments of the input media stream to generate an audio stream.

Example 25 includes the device of any of Examples 1 to 24, wherein the output of the feature extractor includes feature data.

Example 26 includes the device of any of Examples 1 to 25, wherein the one or more processors are further configured to pass the at least one representation of the at least one utterance class from a first iteration of the utterance classifier as an input to the utterance classifier during a subsequent iteration of the utterance classifier.

Example 27 includes the device of any of Examples 1 to 26, wherein the one or more processors are further configured to pass the media output segment identifier from a first iteration of the segment matcher as an input to the segment matcher during a subsequent iteration of the segment matcher.

Example 28 includes the device of any of Examples 1 to 27, wherein the input media stream includes audio representing speech of at least one first person, and the media output segment identifier enables output of corresponding speech of at least one second person.

Example 29 includes the device of any of Examples 1 to 28, wherein the input media stream includes audio representing first speech having a first accent, and the media output segment identifier enables output of corresponding second speech having a second accent.

Example 30 includes the device of any of Examples 1 to 29, wherein the input media stream includes audio representing speech and first noise, and the media output segment identifier enables output of corresponding speech without the first noise.

Example 31 includes the device of any of Examples 1 to 30, wherein the input media stream includes audio representing speech of at least one first person, and the media output segment identifier enables output of corresponding anonymized speech.

Example 32 includes the device of any of Examples 1 to 31, wherein the one or more processors are further configured to concatenate a media segment associated with the media output segment identifier with one or more additional media segments to generate an audio stream.

Example 33 includes the device of any of Examples 1 to 32, further including one or more microphones coupled to the one or more processors, the one or more microphones configured to receive audio data and to generate the input media stream based on the audio data.

Example 34 includes the device of any of Examples 1 to 33, wherein the one or more processors are integrated in at least one of a mobile phone, a tablet computer device, a wearable electronic device, a camera device, a virtual reality headset, a mixed reality headset, or an augmented reality headset.

Example 35 includes the device of any of Examples 1 to 34, further including one or more speakers coupled to the one or more processors, the one or more speakers configured to output sound based on a media segment identified by the media output segment identifier.

According to Example 36, a method includes: inputting one or more segments of an input media stream into a feature extractor; passing an output of the feature extractor into an utterance classifier to produce at least one representation of at least one utterance class of a plurality of utterance classes; and passing the output of the feature extractor and the at least one representation into a segment matcher to produce a media output segment identifier.

Example 37 includes the method of Example 36, wherein the media output segment identifier includes a unit index.

Example 38 includes the method of Example 36 or Example 37, wherein the media output segment identifier identifies a recorded media segment corresponding to at least one phoneme.

Example 39 includes the method of any of Examples 36 to 38, further including passing the media output segment identifier into one or more memory units, wherein the each of the one or more memory units include a set of weights representing a respective media segment.

Example 40 includes the method of Example 39, wherein the one or more memory units produce a speech representation based on the media output segment identifier.

Example 41 includes the method of any of Examples 36 to 40, further including transmitting data indicating the media output segment identifier to another device.

Example 42 includes the method of Example 41, wherein the input media stream includes audio representing speech and transmitting the data indicating the media output segment identifier enables real-time generation of speech output at the other device.

Example 43 includes the method of any of Examples 36 to 38, further including retrieving, from a database, a media segment corresponding to the media output segment identifier.

Example 44 includes the method of any of Examples 36 to 43, further including receiving the input media stream over a communication channel.

Example 45 includes the method of any of Examples 36 to 44, further including determining that a particular media segment of the input media stream is not available for playout, and wherein the media output segment identifier corresponds to an estimate of the particular media segment.

Example 46 includes the method of Example 45, further including concatenating the estimate of the particular media segment with one or more media segments of the input media stream to generate an audio stream.

Example 47 includes the method of any of Examples 36 to 46, wherein the output of the feature extractor includes feature data.

Example 48 includes the method of any of Examples 36 to 47, further including passing the at least one representation of the at least one utterance class from a first iteration of the utterance classifier as an input to the utterance classifier during a subsequent iteration of the utterance classifier.

Example 49 includes the method of any of Examples 36 to 48, further including passing the media output segment identifier from a first iteration of the segment matcher as an input to the segment matcher during a subsequent iteration of the segment matcher.

Example 50 includes the method of any of Examples 36 to 49, wherein the input media stream includes audio representing speech of at least one first person, and the media output segment identifier enables output of corresponding speech of at least one second person.

Example 51 includes the method of any of Examples 36 to 50, wherein the input media stream includes audio representing first speech having a first accent, and the media output segment identifier enables output of corresponding second speech having a second accent.

Example 52 includes the method of any of Examples 36 to 51, wherein the input media stream includes audio representing speech and first noise, and the media output segment identifier enables output of corresponding speech without the first noise.

Example 53 includes the method of any of Examples 36 to 52, wherein the input media stream includes audio representing speech of at least one first person, and the media output segment identifier enables output of corresponding anonymized speech.

Example 54 includes the method of any of Examples 36 to 53, further including concatenating a media segment associated with the media output segment identifier with one or more additional media segments to generate an audio stream.

According to Example 55, a non-transitory computer-readable medium stores instructions that, when executed by one or more processors, cause the one or more processors to: input one or more segments of an input media stream into a feature extractor; pass an output of the feature extractor into an utterance classifier to produce at least one representation of at least one utterance class of a plurality of utterance classes; and pass the output of the feature extractor and the at least one representation into a segment matcher to produce a media output segment identifier.

Example 56 includes the non-transitory computer-readable medium of Example 55, wherein the media output segment identifier includes a unit index.

Example 57 includes the non-transitory computer-readable medium of Example 55 or Example 56, wherein the media output segment identifier identifies a recorded media segment corresponding to at least one phoneme.

Example 58 includes the non-transitory computer-readable medium of any of Examples 55 to 57, wherein the instructions, when executed by the one or more processors, further cause the one or more processors to pass the media output segment identifier into one or more memory units, wherein the each of the one or more memory units include a set of weights representing a respective media segment.

Example 59 includes the non-transitory computer-readable medium of Example 58, wherein the one or more memory units produce a speech representation based on the media output segment identifier.

Example 60 includes the non-transitory computer-readable medium of any of Examples 55 to 59, wherein the instructions, when executed by the one or more processors, further cause the one or more processors to cause data indicating the media output segment identifier to be transmitted to another device.

Example 61 includes the non-transitory computer-readable medium of Example 60, wherein the input media stream includes audio representing speech, and transmission of the data indicating the media output segment identifier enables real-time generation of speech output at the other device.

Example 62 includes the non-transitory computer-readable medium of any of Examples 55 to 57, wherein the instructions, when executed by the one or more processors, further cause the one or more processors to retrieve, from a database, a media segment corresponding to the media output segment identifier.

Example 63 includes the non-transitory computer-readable medium of any of Examples 55 to 62, wherein the input media stream is received over a communication channel.

Example 64 includes the non-transitory computer-readable medium of any of Examples 55 to 63, wherein the instructions, when executed by the one or more processors, further cause the one or more processors to determine that a particular media segment of the input media stream is not available for playout, and wherein the media output segment identifier corresponds to an estimate of the particular media segment.

Example 65 includes the non-transitory computer-readable medium of Example 64, wherein the instructions, when executed by the one or more processors, further cause the one or more processors to concatenate the estimate of the particular media segment with one or more media segments of the input media stream to generate an audio stream.

Example 66 includes the non-transitory computer-readable medium of any of Examples 55 to 65, wherein the output of the feature extractor includes feature data.

Example 67 includes the non-transitory computer-readable medium of any of Examples 55 to 66, wherein the instructions, when executed by the one or more processors, further cause the one or more processors to pass the at least one representation of the at least one utterance class from a first iteration of the utterance classifier as an input to the utterance classifier during a subsequent iteration of the utterance classifier.

Example 68 includes the non-transitory computer-readable medium of any of Examples 55 to 67, wherein the instructions, when executed by the one or more processors, further cause the one or more processors to pass the media output segment identifier from a first iteration of the segment matcher as an input to the segment matcher during a subsequent iteration of the segment matcher.

Example 69 includes the non-transitory computer-readable medium of any of Examples 55 to 68, wherein the input media stream includes audio representing speech of at least one first person, and the media output segment identifier enables output of corresponding speech of at least one second person.

Example 70 includes the non-transitory computer-readable medium of any of Examples 55 to 69, wherein the input media stream includes audio representing first speech having a first accent, and the media output segment identifier enables output of corresponding second speech having a second accent.

Example 71 includes the non-transitory computer-readable medium of any of Examples 55 to 70, wherein the input media stream includes audio representing speech and first noise, and the media output segment identifier enables output of corresponding speech without the first noise.

Example 72 includes the non-transitory computer-readable medium of any of Examples 55 to 71, wherein the input media stream includes audio representing speech of at least one first person, and the media output segment identifier enables output of corresponding anonymized speech.

Example 73 includes the non-transitory computer-readable medium of any of Examples 55 to 72, wherein the instructions, when executed by the one or more processors, further cause the one or more processors to concatenate a media segment associated with the media output segment identifier with one or more additional media segments to generate an audio stream.

According to Example 74, an apparatus includes: means for inputting one or more segments of an input media stream into a feature extractor; means for passing an output of the feature extractor into an utterance classifier to produce at least one representation of at least one utterance class of a plurality of utterance classes; and means for passing the output of the feature extractor and the at least one representation into a segment matcher to produce a media output segment identifier.

Example 75 includes the apparatus of Example 74, wherein the media output segment identifier includes a unit index.

Example 76 includes the apparatus of Example 74 or Example 75, wherein the media output segment identifier identifies a recorded media segment corresponding to at least one phoneme.

Example 77 includes the apparatus of any of Examples 74 to 76, further including means for passing the media output segment identifier into one or more memory units, wherein the each of the one or more memory units include a set of weights representing a respective media segment.

Example 78 includes the apparatus of Example 77, wherein the one or more memory units produce a speech representation based on the media output segment identifier.

Example 79 includes the apparatus of any of Examples 74 to 78, further including means for transmitting data indicating the media output segment identifier to another device.

Example 80 includes the apparatus of Example 79, wherein the input media stream includes audio representing speech and transmitting the data indicating the media output segment identifier enables real-time generation of speech output at the other device.

Example 81 includes the apparatus of any of Examples 74 to 76, further including means for retrieving, from a database, a media segment corresponding to the media output segment identifier.

Example 82 includes the apparatus of any of Examples 74 to 81, further including means for receiving the input media stream over a communication channel.

Example 83 includes the apparatus of any of Examples 74 to 82, further including means for determining that a particular media segment of the input media stream is not available for playout, and wherein the media output segment identifier corresponds to an estimate of the particular media segment.

Example 84 includes the apparatus of Example 83, further including means for concatenating the estimate of the particular media segment with one or more media segments of the input media stream to generate an audio stream.

Example 85 includes the apparatus of any of Examples 74 to 84, wherein the output of the feature extractor includes feature data.

Example 86 includes the apparatus of any of Examples 74 to 85, further including means for passing the at least one representation of the at least one utterance class from a first iteration of the utterance classifier as an input to the utterance classifier during a subsequent iteration of the utterance classifier.

Example 87 includes the apparatus of any of Examples 74 to 86, further including means for passing the media output segment identifier from a first iteration of the segment matcher as an input to the segment matcher during a subsequent iteration of the segment matcher.

Example 88 includes the apparatus of any of Examples 74 to 87, wherein the input media stream includes audio representing speech of at least one first person, and the media output segment identifier enables output of corresponding speech of at least one second person.

Example 89 includes the apparatus of any of Examples 74 to 88, wherein the input media stream includes audio representing first speech having a first accent, and the media output segment identifier enables output of corresponding second speech having a second accent.

Example 90 includes the apparatus of any of Examples 74 to 89, wherein the input media stream includes audio representing speech and first noise, and the media output segment identifier enables output of corresponding speech without the first noise.

Example 91 includes the apparatus of any of Examples 74 to 90, wherein the input media stream includes audio representing speech of at least one first person, and the media output segment identifier enables output of corresponding anonymized speech.

Example 92 includes the apparatus of any of Examples 74 to 91, further including means for concatenating a media segment associated with the media output segment identifier with one or more additional media segments to generate an audio stream.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:
one or more processors configured to:
input one or more segments of an input media stream into a feature extractor;
pass an output of the feature extractor into an utterance classifier to produce at least one representation of at least one utterance class of a plurality of utterance classes; and
pass the output of the feature extractor and the at least one representation into a segment matcher to determine a media output segment identifier;
pass the media output segment identifier into one or more memory units, wherein each of the one or more memory units includes a set of weights representing a respective media segment.

2. The device of claim 1, wherein the segment matcher is configured to obtain, based on the at least one representation, data representing one or more candidate frames of a media output segment and perform a comparison of the data representing the one or more candidate frames to the output of the feature extractor, and wherein the media output segment identifier is determined based on a result of the comparison.

3. The device of claim 1, wherein the segment matcher is configured to:
obtain data representing a plurality of candidate frames, each candidate frame of the plurality of candidate frames corresponding to a portion of a respective media output segment; and
determine frame match scores for the plurality of candidate frames, wherein a frame match score of a particular candidate frame indicates an estimate of similarity of the particular candidate frame to an input frame represented by the output of the feature extractor, wherein the media output segment identifier is determined based, at least partially, on the frame match score.

4. The device of claim 3, wherein the segment matcher is configured to determine the frame match score for the particular candidate frame by passing the output of the feature extractor and data representing the particular candidate frame into a trained machine-learning model to cause the trained machine-learning model to output the frame match score for the particular candidate frame.

5. The device of claim 3, wherein the output of the feature extractor includes one or more speech parameter values for the input frame, and wherein the segment matcher is configured to determine the frame match score for the particular candidate frame based on comparison of speech parameter values of the one or more speech parameter values for the input frame and one or more corresponding speech parameter values for the particular candidate frame.

6. The device of claim 3, wherein the segment matcher is configured to:
   determine, based on the one or more frame match scores, one or more candidate segments; and
   for each of the one or more candidate segments, determine a segment match score, wherein the segment match score of a particular candidate segment indicates an estimate of similarity of the particular candidate segment to an input segment represented by the output of the feature extractor, wherein the media output segment identifier is determined based, at least partially, on the one or more segment match scores.

7. The device of claim 6, wherein the media output segment identifier identifies a media output segment associated with a largest segment match score among the one or more candidate segments.

8. The device of claim 6, wherein the segment matcher is configured to determine the segment match score of the particular candidate segment based on dynamic time warping of data representing the particular candidate segment and data representing the input segment.

9. The device of claim 6, wherein the segment matcher is configured to, for each input frame of an input segment, determine multiple frame match scores with respect to the input frame, wherein the input segment includes multiple input frames, and wherein the segment match score of the particular candidate segment is based on frame match scores for candidate frames as compared to different ones of the multiple input frames and is further based on memory locations associated with the candidate frames.

10. The device of claim 6, wherein the segment match score of the particular candidate segment is further based on the at least one representation of at least one utterance class.

11. The device of claim 1, wherein the segment matcher is configured to:
   obtain data representing one or more candidate frames of a media output segment;
   perform a comparison of the data representing the one or more candidate frames to the output of the feature extractor to identify one or more candidate segments; and
   determine, based on the at least one representation, a best match media output segment of the one or more candidate segments, and wherein the media output segment identifier identifies the best match media output segment.

12. The device of claim 1, wherein the one or more processors are further configured to pass one or more constraints to the segment matcher to determine the media output segment identifier.

13. The device of claim 12, wherein the one or more constraints include a talker identifier.

14. The device of claim 1, wherein the media output segment identifier identifies a recorded media segment corresponding to at least one phoneme.

15. The device of claim 1, further comprising a modem coupled to the one or more processors, the modem configured to transmit data indicating the media output segment identifier to another device.

16. The device of claim 1, further comprising one or more receivers configured to receive the input media stream over a communication channel.

17. The device of claim 1, wherein the one or more processors are further configured to determine that a particular media segment of the input media stream is not available for playout, and wherein the media output segment identifier corresponds to an estimate of the particular media segment.

18. The device of claim 17, wherein the one or more processors are further configured to concatenate the estimate of the particular media segment with one or more media segments of the input media stream to generate an audio stream.

19. The device of claim 1, wherein the input media stream includes audio representing speech of at least one first person, and the media output segment identifier enables output of corresponding speech of at least one second person.

20. The device of claim 1, wherein the input media stream includes audio representing first speech having a first accent, and the media output segment identifier enables output of corresponding second speech having a second accent.

21. The device of claim 1, wherein the input media stream includes audio representing speech and first noise, and the media output segment identifier enables output of corresponding speech without the first noise.

22. The device of claim 1, wherein the input media stream includes audio representing speech of at least one first person, and the media output segment identifier enables output of corresponding anonymized speech.

23. The device of claim 1, wherein the one or more processors are further configured to concatenate a media segment associated with the media output segment identifier with one or more additional media segments to generate an audio stream.

24. The device of claim 1, further comprising one or more microphones coupled to the one or more processors, the one or more microphones configured to receive audio data and to generate the input media stream based on the audio data.

25. The device of claim 1, wherein the one or more processors are integrated in at least one of a mobile phone, a tablet computer device, a wearable electronic device, a camera device, a virtual reality headset, a mixed reality headset, or an augmented reality headset.

26. The device of claim 1, further comprising one or more speakers coupled to the one or more processors, the one or more speakers configured to output sound based on a media segment identified by the media output segment identifier.

27. A method comprising:
   inputting one or more segments of an input media stream into a feature extractor;
   passing an output of the feature extractor into an utterance classifier to produce at least one representation of at least one utterance class of a plurality of utterance classes; and
   passing the output of the feature extractor and the at least one representation into a segment matcher to produce a media output segment identifier;
   pass the media output segment identifier into one or more memory units, wherein each of the one or more memory units includes a set of weights representing a respective media segment.

28. A non-transitory computer-readable medium comprising instructions that, when executed by one or more processors, cause the one or more processors to:
   input one or more segments of an input media stream into a feature extractor;
   pass an output of the feature extractor into an utterance classifier to produce at least one representation of at least one utterance class of a plurality of utterance classes; and pass the output of the feature extractor and the at least one representation into a segment matcher to produce a media output segment identifier;

pass the media output segment identifier into one or more memory units, wherein each of the one or more memory units includes a set of weights representing a respective media segment.

29. An apparatus comprising:

means for inputting one or more segments of an input media stream into a feature extractor;

means for passing an output of the feature extractor into an utterance classifier to produce at least one representation of at least one utterance class of a plurality of utterance classes; and means for passing the output of the feature extractor and the at least one representation into a segment matcher to produce a media output segment identifier;

means for passing the media output segment identifier into one or more memory units, wherein each of the one or more memory units includes a set of weights representing a respective media segment.

\* \* \* \* \*